United States Patent
Nojima

(10) Patent No.: US 7,260,578 B2
(45) Date of Patent: Aug. 21, 2007

(54) DATABASE-FILE LINK SYSTEM AND METHOD THEREFOR

(75) Inventor: Hiroshi Nojima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 10/847,333

(22) Filed: May 18, 2004

(65) Prior Publication Data

US 2004/0199540 A1    Oct. 7, 2004

Related U.S. Application Data

(63) Continuation of application No. 09/819,708, filed on Mar. 29, 2001, now abandoned.

(30) Foreign Application Priority Data

Mar. 30, 2000   (JP)   ............................. 2000-095934

(51) Int. Cl.
G06F 17/30    (2006.01)
(52) U.S. Cl. ..................................... 707/100
(58) Field of Classification Search .................... 707/1, 707/2, 9, 10, 102; 709/246
See application file for complete search history.

(56) References Cited

U.S. PATENT DOCUMENTS

| | | | |
|---|---|---|---|
| 5,619,690 A | 4/1997 | Matsumani et al. | |
| 6,505,199 B1 | 1/2003 | Nakano et al. | |
| 6,564,215 B1 | 5/2003 | Hsaio et al. | |
| 6,850,938 B1 * | 2/2005 | Sadjadi | 707/8 |
| 2003/0018653 A1 | 1/2003 | Iwasaki et al. | |

FOREIGN PATENT DOCUMENTS

JP    2000-181777    6/2000

* cited by examiner

Primary Examiner—Etienne LeRoux
(74) Attorney, Agent, or Firm—Mattingly, Stanger, Malur & Brundidge, P.C.

(57) ABSTRACT

A database management system has a data structure intending to manage external files and an external file linking function extension called during an update process of a record including the data structure, whereby update of the record is carried out in synchronism with update of the content of an external file to maintain matching between the record and the external file. By reflecting the update on only a link destination file of an updated database record in accordance with the number of references from the database record to the file, the edition management of files using the database can be realized.

44 Claims, 17 Drawing Sheets

FIG. 2

TABLE INFORMATION 344

EXTERNAL FILE MANAGEMENT TABLE 4011

| NUMBER | TITLE | | | EXTERNAL FILE | |
|---|---|---|---|---|---|
| 101 | sunset | images | server01 | /db/images/sunsen | directory |
| 102 | sunflower | | server01 | /db/images/sunflower.bmp | file |
| 103 | dandelion | | server02 | /db/pictures/dandelion.jpg | file |

| rcd001 |
| rcd002 |
| rcd003 |

| fld001 | fld002 | fld003 |

FIG. 3

| # | EXTERNAL FILE LINKING FUNCTION EXTENSION | PARAMETER | DBMS TIMING |
|---|---|---|---|
| 1 | CONTENTS LINK REGISTRATION | TRANSACTION IDENTIFIER, FILE ABSTRACT DATA TYPE VALUE | DURING INSERT PROCESS, DURING UPDATE PROCESS (IN THE CASE OF UPDATE OF LINK INFORMATION) |
| 2 | CONTENTS LINK DELETE | TRANSACTION IDENTIFIER, FILE ABSTRACT DATA TYPE VALUE | DURING DELETE PROCESS, DURING UPDATE PROCESS (IN THE CASE OF UPDATE OF LINK INFORMATION) |
| 3 | CONTENTS UPDATE | TRANSACTION IDENTIFIER, OLD FILE ABSTRACT DATA TYPE VALUE, NEW FILE ABSTRACT DATA VALUE | DURING UPDATE STATEMENT PROCESS (IN THE CASE OF UPDATE OF LINK DESTINATION FILE) |
| 4 | COMMIT PROCESS | TRANSACTION IDENTIFIER | DURING COMMIT PROCESS |
| 5 | ROLLBACK PROCESS | TRANSACTION IDENTIFIER | DURING ROLLBACK PROCESS |
| 6 | REGISTRATION PARAMETER SETTING, FILE ABSTRACT DATA TYPE FUNCTION NEW() | REGISTRATION HANDLE | BEFORE PROCESSING OF EACH LINE DURING INSERT OR UPDATE PROCESS |
| 7 | UPDATE PARAMETER SETTING, FILE ABSTRACT DATA TYPE FUNCTION UPDATE () | UPDATE HANDLE | BEFORE PROCESSING OF EACH LINE DURING UPDATE PROCESS |
| 8 | ACCESS HANDLE CREATION, FILE ABSTRACT DATE TYPE FUNCTION GET_ACCESSHANDLE() | FILE ABSTRACT DATA TYPE VALUE | DURING FETCH STATEMENT PROCESS |

FIG. 4

(1) LINK REGISTRATION
   INSERT INTO images
       VALUES (104,'dandelion',new(:entryhandle))

(2) LINK DELETE
   DELETE FROM images    WHERE NUMBER=103

(3) LINK UPDATE
   UPDATE images SET EXTERNAL FILE=new(:entryhandle)
           WHERE NUMBER=103

(4) LINK DESTINATION UPDATE
   UPDATE images SET EXTERNAL FILE=update(:updatehandle)
           WHERE NUMBER=103

(5) SEARCH
   SELECT TITLE ,get_accesshandle(ETERNAL FILE ) FROM images
           WHERE TITLE LIKE'sun%'

FIG. 5

CONTENTS
INFORMATION FILE 244

| REFERENCE NUMBER | | 4121 |
|---|---|---|
| DIRECTORY NAME, | FILE NUMBER | 4122 |
| FILE NAME | FILE SIZE | 4123 |
| ⋮ | ⋮ | |
| DIRECTORY NAME, | FILE NUMBER | |
| FILE NAME | FILE SIZE | |
| ⋮ | ⋮ | |

FIG. 6

4300 REGISTRATION HANDLE

| FMS IDENTIFIER | DIRECTORY PATH |
|---|---|
| server01 | /db/images/dawn.jpg |

4311 · 4312

4400 ACCESS HANDLE

| FMS IDENTIFIER | DIRECTORY PATH |
|---|---|
| server01 | /db/images/sunset.jpg |

4411 · 4412

4500 UPDATE HANDLE

| FMS IDENTIFIER | DIRECTORY PATH | SERIAL NUMBER |
|---|---|---|
| server01 | /db/images/sunset.jpg | 5 |

345 LOG

EXTERNAL FILE LOG

4900

| TRANSACTION IDENTIFIER (4911) | FMS IDENTIFIER (4912) | |
|---|---|---|
| tx003 | server01 | 4921 |
| tx004 | server01 | 4922 |
| tx005 | server02 | 4923 |
| tx006 | server03 | 4924 |
| ⋮ | ⋮ | |

FIG. 10

CONTENTS LINK REGISTRATION PROCESS IN USER PROGRAM
↓
CALL FMS TO TRANSFER FILE DATA AND ACQUIRE REGISTRATION HANDLE CREATED WITH FMS — 5001
↓
INSERT STATEMENT PROCESS IN DBMS — 5002
↓
COMMIT STATEMENT (OR ROLLBACK STATEMENT) IN DBMS — 5003
↓
CALL FMS TO RELEASE REGISTRATION HANDLE — 5004
↓
END

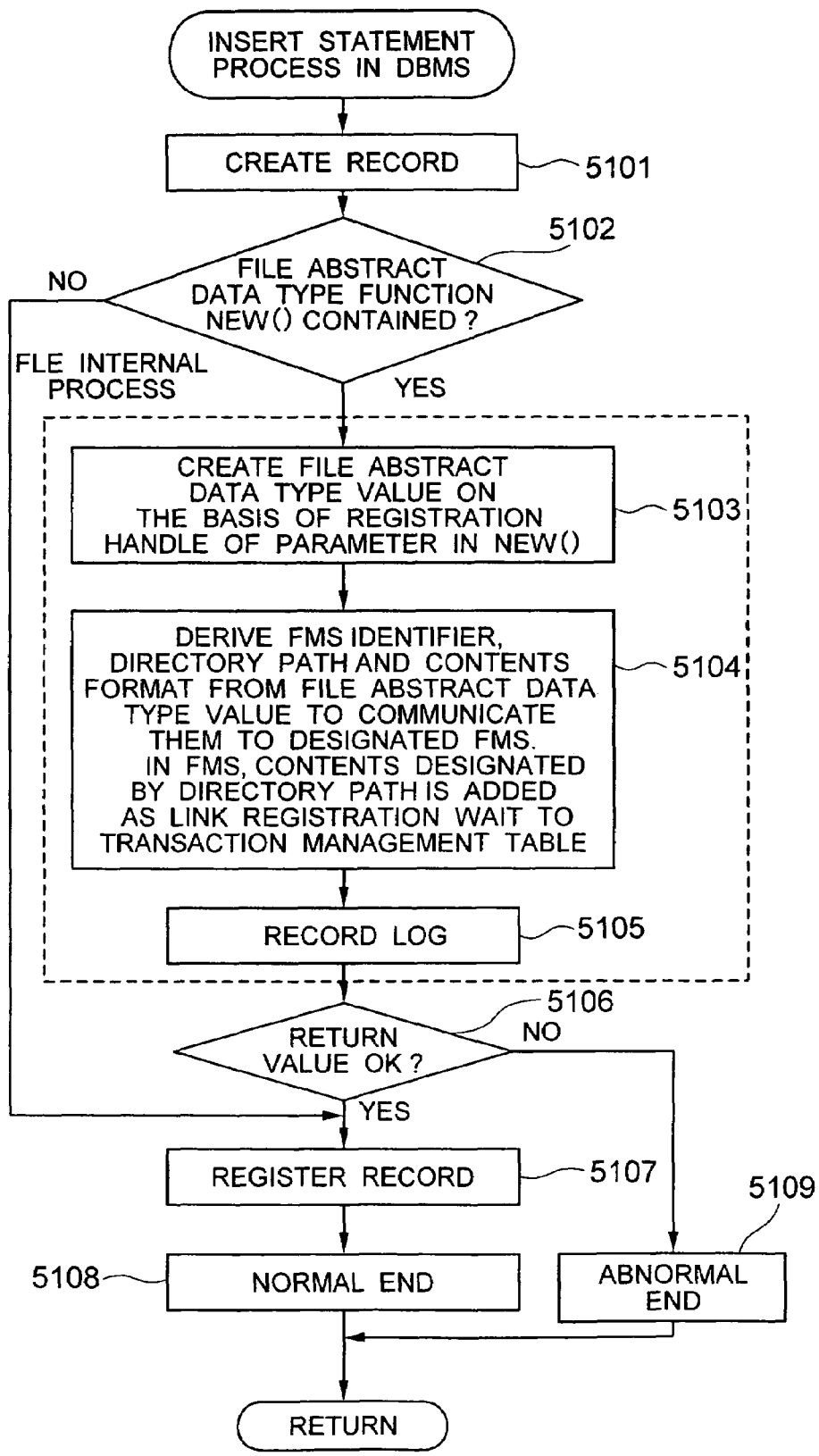

DATABASE-FILE LINK SYSTEM AND METHOD THEREFOR

This application is a continuation of U.S. patent application No. 09/819,708, filed Mar. 29, 2001, now abandoned, which is incorporated by reference herein in its entirety.

CROSS-REFERENCE TO RELATED APPLICATIONS

The present application is related to a co-pending application No. 09/452,172 entitled "DATABASE PROCESSING METHOD, APPARATUS ROR IMPLEMENTING SAME, AND MEDIUM CONTAINING PROCESSING PROGRAM THEREFOR" filed by Y. NAKANO et al on Dec. 1, 1999 and a co-pending application No. 09/433,553 entitled "DATABASE MANAGEMENT METHOD, SYSTEM FOR PRACTICING THE METHOD AND MEDIUM RECORDING PROCESS PROGRAM" filed by K. IWASAKI et al on Nov. 4, 1999.

BACKGROUND OF THE INVENTION

The present invention relates to a system for managing "files" defined by a file system of operating system (hereinafter referred to as an OS file system), under the control of a database management system (hereinafter referred to as a DBMS) and more particularly, to database-file link method and apparatus which are effective when the content of a file managed by the database management system is updated.

Datalinks in a database for managing external data are disclosed in "DATALINKS: MANAGING EXTERNAL DATA WITH DB2 UNIVERSAL DATABASE" by J. R. Davis, IBM CORPORATION, February 1999, pp 1-18.

For managing "files" or "directories" (hereinafter, a single file, plural files and a plurality of files concomitant with a directory structure are generally termed "contents"), a method is available in which location information of a file or directory (a so-called directory path) is written in one field inside a record. In this method, this stored data is seen as a mere character line when viewed from the DBMS side, so that the method does not recognize that the character line designates a file or directory and is unaware of the attribute including file size and of distinction between the file and the directory. In other words, the user must manage a contents designated by a directory path of interest independently of the DBMS. A user program preparing or creating a database according to the method as above searches the database by using a desired field as a search key and a character line in the field written with the directory path in a record of interest is acquired so that the character line may be regarded as the directory path to reference the contents.

According to the prior arts for directly storing the directory path in the record of the data-base, management of the external contents is carried out independently of management of the field storing the directory path and there is a possibility that update/delete applied to the external contents is executed asynchronously with update/delete of the field value in the database, thus making mismatching between the database and the external contents liable to occur. Once matching is disturbed, recovery of matched conditions is difficult to achieve.

Further, in the case of the aforementioned prior arts, in making the correspondence relation between the same contents and a plurality of fields in the database, the number of fields holding the correspondence relation must be managed additionally. Without this management, when a contents is updated and deleted, even the content of a link destination as viewed from a field of the database representing a different link originator is updated, resulting in mismatching. As will be seen from the above, it is difficult to apply the prior arts to the edition management of the contents by using the database.

As described above, the prior arts have difficulties in keeping the link matching between the database and the external file in operation, raising a problem that the confirmation procedure during execution of update/delete of the content of an external contents becomes complicated.

SUMMARY OF THE INVENTION

An object of the present invention is to provide method and apparatus capable of maintaining matching of reference from the database and update matching by carrying out a process for link to external contents on extension of a transaction of the database.

In order to manage an external contents by using the DBMS, a file abstract data type is introduced into the DBMS. The file abstract data type provides a data structure for storing location information (file server name, directory path and the like) concerning the contents to be managed and a function for processing that information. By defining a table having fields of the file abstract data type, the DBMS user can register an external contents in the database as a link destination in the table.

Further, in order to manage contents under management of the DBMS, a file management system having a higher file accessing right than the general users (hereinafter called a DBMS external file management system) is introduced. The contents under management of the DBMS is set with access control information that is possessed by the DBMS external file management system and cannot be referenced/updated from the general users on the level of the OS file system. For the sake of managing a contents as a link destination in the abstract data type field, the DBMS external file management system has a mechanism for managing a file structure inside the contents representing the link destination. With the aim of managing one contents as a plurality of link destinations in abstract data type fields, the DBMS external file management system has a mechanism for managing the number of links. Further, in order to update the content of a link destination contents on extension of a DBMS transaction, the DBMS external file management system has a mechanism for retaining update difference information.

In order to link the file management information stored in the table to the DBMS external file management system, an external file linking function is defined, inside the DBMS, as a function to process the file abstract data type and is set such that a corresponding process of the DBMS external file management system is called at the opportunity of execution of a database operation (for example, an INSERT process, a COMMIT process or the like).

Also, in order to provide means for enabling the user of the DBMS to access a contents as a result of search, the external file linking function is provided with a function to create an access handle during search of a database record. This function is called from a function provided by the file abstract data type. For referencing the contents under management of the DBMS, the database record is searched to acquire the aforementioned access handle through the function of the file abstract data type and a file referencing function of the DBMS external file management system is called using the access handle.

In addition, in order to provide means for enabling the user of the DBMS to update the content of a link destination contents in the field of the database, the external file linking function is provided with a function to register update information for a contents under management of the DBMS by an access handle acquired through search of the database record. For updating the contents under management of the DBMS, an update handle acquired during the update information registration is used to update the field value through a transaction of the database, so that a file update function of the DBMS external file management system is called to update the content of the contents at the link destination.

By linking the database operation process with the file operation process in this manner, maintenance of matching between the database record and the contents managed in association with the record can be carried out on extension of an operation applied to the database management system, thus ensuring that matching of reference from the database and matching of update can be guaranteed.

In another aspect of the invention, there is provided a database managing method for managing table information containing a record and data not stored in the table information, wherein when a request for process of said data is inputted, a data structure indicating the processing procedure for the management is created on the basis of position management information storing position information of said data contained in said record and said inputted process request, and when a commit process is carried out in a transaction for processing said process request, a process of maintaining consistency concerning said data is executed on the basis of said data structure.

BRIEF DESCRIPTION OF THE DRAWINGS

FIG. 2 is a diagram showing an example of structure of a table for managing external files in the embodiment.

FIG. 3 is a diagram showing a list of processes of external file linking function extension.

FIG. 4 shows DB operation statements.

FIG. 5 is a diagram showing an example of data structure of a contents information file.

FIG. 6 is a diagram showing examples of data structures of a registration handle used for contents link registration processing, of an access handle used for contents access processing and contents update processing and of an update handle used for contents update processing.

FIG. 9 is a diagram showing an example of a data structure of an external file log acquired by the external file linking function extension (FLE).

FIG. 10 is a flow chart of a contents link registering process in a user program.

FIG. 11 is a flow chart of an INSERT statement process in the DBMS.

DETAILED DESCRIPTION OF THE EMBODIMENTS

Embodiments of the present invention will be described in greater detail with reference to the accompanying drawings.

Figure 1:
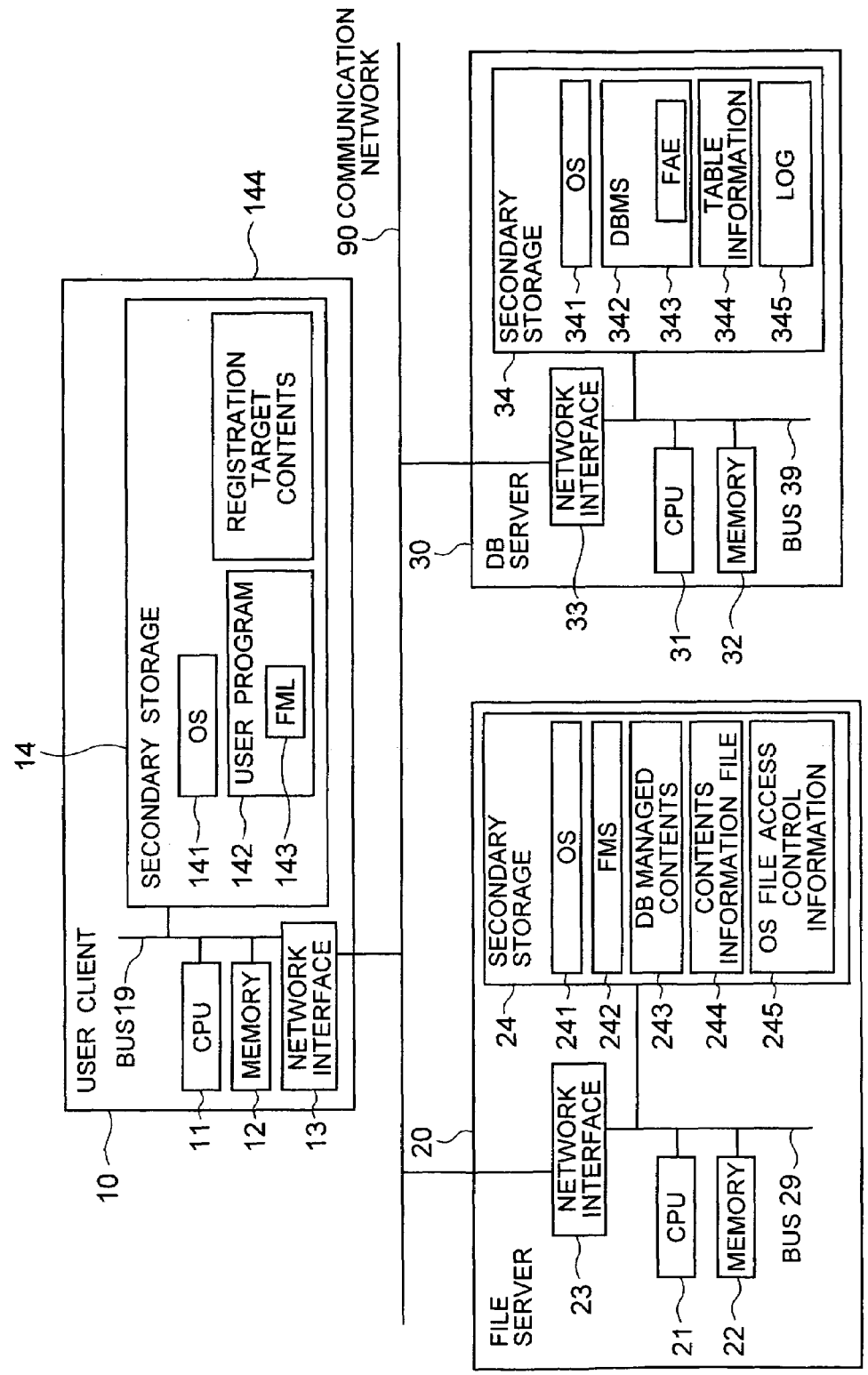
FIG. 1 is a block diagram showing the schematic construction of a database system according to an embodiment of the invention.

When the present invention is applied to a distributed data management system comprised of a database server (hereinafter called a DB server), a file server and a user client, individual computers and software operating thereon are constructed as shown in a system block diagram of FIG. 1.

The user client, file server and DB server designated by reference numerals 10, 20 and 30, respectively, are mutually connected through a communication network 90.

The user client 10 includes a CPU 11, a memory 12, a network interface 13 and a secondary storage 14 which are coupled with each other through a bus 19. The user client 10 is coupled to the communication network 90 via the network interface 13. Stored on the secondary storage 14 are an operating system (hereinafter called an OS) 141, a user program 142, a DBMS external file linking library (hereinafter called an FLL) 143 and a registration target contents 144 to be registered from the user program into a database. In the present embodiment, the user program 142 is. described as being so implemented as to give a library call to the FLL 143 but the invention can of course be practiced with other implementation modes.

The file server 20 includes a CPU 21, a memory 22, a network interface 23 and a secondary storage 24 which are coupled with each other through a bus 29. The file server 20 is coupled to the communication network 90 via the network interface 23. Stored on the secondary storage 24 are an OS 241, a DBMS external file management system (hereinafter called an FMS) 242, a DB managed contents 243 registered in a database, a contents information file 244 for retaining, for example, attribute information of the DB managed contents, and an OS file access control information 245 concerning the DB managed contents 243 and contents information file 244. The DB managed contents 243 can be placed one by one separately under the DB management or a plurality of files can be placed collectively under the DB management.

The DB server 30 includes a CPU 31, a memory 32, a network interface 33 and a secondary storage 34 which are coupled with each other through a bus 39. The DB server 30 is coupled to the communication network 90 via the network interface 33. Stored on the secondary storage 34 are an OS 341, a DBMS 342, an external file linking function extension (hereinafter called an FLE) 343 of the DBMS, table information 344 managed by the DBMS 342 and a log 345 of operations concerning update of the table in the DBMS 342. Details of the table information 344 will be described later.

The DBMS 342 employs SQL (Structured Query Language) as an interface and is so extended as to have the ability to handle the file abstract data type in addition to the typical SQL data type. The file abstract data type provides a data structure that stores information for management of files and a function group dedicated to the data structure. In the DBMS 342, a module for implementing the processing function of the file abstract data type is the aforementioned FLE 343. In the present embodiment, the DBMS 342 is described as being so implemented as to give a library call to the FLE 343 but the present invention can of course be practiced with other implementation modes. The DBMS 342 executes the process in a unit of transaction. More particularly, at the time that a commit process request is issued from the user program 142, a process performed from the user program 142 is settled and is reflected on data within the DBMS. In case a rollback process request is issued from the user program 142, a process performed from the user program 142 is invalidated and is not reflected on data within the DBMS. Also, in case carrying out of a rollback process is settled in accordance with process standards of the DBMS 342 per se, a process performed from the user program 142 is invalidated and is not reflected on data within the DBMS. Transaction identifiers for uniquely distinguishing the individual transactions are given by the DBMS.

A DBMS external file management system realized with the present invention is comprised of the FMS 242 on file server 20, the FLL 143 on user client 10 and the FLE 343 in DBMS 342 on the DB server 30.

The FMS 242 on file server 20 is permitted to operate by the authority of a user (FMS) having a higher right to access files than general users. During database registration, the OS file accessing control information 245 for DB managed contents 243 is updated by means of the FMS 242 so that the DB managed contents 243 may be set so as to neither referenced nor updated by other components than the FMS 242. In this manner, files registered in the database can be prevented from being referenced and/or updated without authorization. During database registration, attribute information concerning the DB managed contents 243 is retained in the contents information file 244.

The FMS 242 on file server 20 has interfaces to the external file linking function extension FLE 343 and the DBMS external file linking library FLL 143. These interfaces are implemented using means generally called remote procedure call (hereinafter simply referred to as RPC). By virtue of the RPC, a program can call a function in a different program by designating an identifier of the called program and a function name.

Referring to FIGS. 2 to 4, the file abstract data type and the external file linking function extension FLE 343 will be described.

FIG. 2 shows a structure of an external file management table 4000 stored in the table information 344. The illustrated field structure is a mere example and the present invention can of course be practiced with a table of a different table structure. The table 4000 has three fields of number 4011 of integer type, title 4012 of character line type and external file 4013 of file abstract data type. The DBMS gives record identifier 4001 and field identifier 4002 to records and fields of the table 4000, respectively. The record identifier 4001 is for definitely or uniquely identifying records contained in the table 4000. The field identifier 4002 is for definitely or uniquely identifying fields constituting each of the records.

The external file 4013 of file abstract data type has a data structure which stores FMS identifier 4014, directory path 4015 and contents format 4016 for indicating whether the contents is a file or a directory. The present invention can of course be practiced even when other additional information is added to the data structure of file abstract data type.

FIG. 3 shows the correspondence between processes in the DBMS 342 and processes in the external file linking function extension FLE 343 related to the processes in the DBMS 342. "Parameter" indicates information that is handed over when the DBMS 342 calls a function in the FLE 343 and "DBMS timing" indicates a time point that the DBMS 342 calls the FLE 343 in the course of database processing. The individual linking functions will be described below.

A contents link registration linking function at #1 is called when the DBMS 342 processes an INSERT statement in SQL to set a link to the DB managed contents 243 or when the DBMS 342 processes an UPDATE statement in SQL to set a link to the DB managed contents 243. As a calling parameter, a transaction identifier of the current transaction and a file abstract data type value are given. Information concerning the contents 243 placed under the database management as a result of the calling is stored in external file 4013 of a record prepared or created by the INSERT statement or by the UPDATE statement and update information is stored in the log 345.

A contents link delete linking function at #2 is called when the DBMS 342 processes a DELETE statement in SQL to delete a link to the DB managed contents 243 or when the DBMS 342 processes an UPDATE statement in SQL to delete a link to the DB managed contents 243. As a calling parameter, a transaction identifier of the current transaction and a file abstract data type value are given. Update information concerning external file 4013 of a record to be deleted as a result of the calling is stored in the log 345.

A contents update linking function at #3 is called when the DBMS 342 processes an UPDATE statement in SQL to update the content of the DB managed contents 243. As a calling parameter, a transaction identifier of the current transaction and file abstract data type values before and after the updating are given. As a result of the calling, update information concerning external file 4013 of a record to be updated is stored in the log 345.

A linking function for commit process at #4 is called when the DBMS 342 commit-ends the current transaction. As a calling parameter, a transaction identifier of the transaction to be commit-ended is given. As a result of the calling, of information concerning the contents link registration process, contents link delete process and contents update process and being stored in the log 345, those having the designated transaction identifier are each settled for the related DB managed contents 243 and are deleted from the log 345.

A linking function for rollback process at #5 is called when the DBMS 342 rollback-ends the current transaction. As a calling parameter, a transaction identifier of the transaction to be rollback-ended is given. As a result of the calling, of information concerning the contents link registration process, contents link delete process and contents update process and being stored in the log 345, those having the designated transaction identifier are all deleted from the log 345.

A registration parameter setting linking function at #6, that is, a file abstract data type function new( ) is embedded in an INSERT statement or UPDATE statement to designate a parameter concerning contents link registration. In the user program 142, a registration handle is designated as the parameter. In this process, a value as the file abstract data type is structured. This value can be either the same value as the registration handle or a value subjected to any conversion process inside new( ) for the purpose of practicing the present invention.

An update parameter setting linking function at #7, that is, a file abstract data type function update( ) is embedded in an UPDATE statement to set a parameter concerning update of a contents. In the user program 142, an update handle is designated as the parameter. In this process, a value as the file abstract data type is structured.

An access handle preparing (creating) linking function at #8, that is, a file abstract data type function get_accesshandle( ) is embedded in a SELECT statement in SQL to acquire an access handle for accessing contents registered in the database. The user program 142 acquires an access handle representing a return value of this function through a FETCH statement in SQL.

Referring to FIG. 4, there is shown an example of a DB operation statement for the external file management table 4000. Individual items will be described below.

Described in (1) is an INSERT statement for record registration accompanied by link registration to an external contents. The aforementioned function new( ) of file abstract data type is designated at the third of VALUES phrase. A registration handle of the contents to be registered is stored in the variable : entryhandle representing the parameter of this function new( ). In this example, a record having 104 in number 4011, "dandelion" in title 4012 and information concerning the external contents designated by entryhandle in external file 4013 is registered in the database, so that the designated contents is placed under management of the DBMS and a link is set. The link registration is, however, settled at the time that the DBMS transaction commits.

Described in (2) is a DELETE statement for record delete. In this example, a record having 100 in number 4011 is deleted and a link to an external contents designated by external file 4013 of this record is deleted. The link delete is, however, settled at the time that the DBMS transaction commits.

Described in (3) is an UPDATE statement for update of external file 4013. In this example, by designating the aforementioned function new( ) of file abstract data type to external file 4013 of a record having 103 in number 4011 while storing a registration handle of a contents to be newly registered in the variable: entryhandle, the link information to the contents which has already been managed by external file 4013 is replaced with link information to a different contents. More specifically, the link to the former link destination contents is deleted and a link to a new contents is set. The link registration and the link delete are, however, settled at the time that the DBMS transaction commits.

Described in (4) is an UPDATE statement for update of the content of an external contents designated at external file 4013. In this example, an external contents designated by external file 4013 of a record having 103 in number 4011 is updated on the basis of update difference information indicated by an update handle designated by the parameter : update-handle in file abstract data type function update. The update of the content is, however, reflected on the external contents at the time that the DBMS transaction is commits.

Described in (5) is a SELECT statement for acquisition of an access handle for accessing an external contents. In this example, a record having title 4012 starting with 'sun' is an object to be searched. When the content of the external file management table 4000 is in a state as shown in FIG. 2, records 4021 and 4022 are involved. As a result of search, title 4012 of the records and the access handle which are returned as a return value of the function get_accesshandle ( ) of abstract data type are acquired.

Next, examples of interfaces in the DBMS external file management system (FMS) 242 will be described. Operation applied to the DB managed contents 243 is carried out through these interfaces.

Firstly, the following seven examples will be noticed as interfaces called by the external file linking function extension (FLE) 343.

(1) A contents registration preparation function is to transfer a registration target contents 144 on the user client 10 to the file server 20 so as to create a DB managed contents 243. As an input, file data of the registration target contents 144 read by the FLL 143 is designated. The file data contains a file name and the content of the file but the format of the file data is not prescribed. Also, a directory path of the DB managed contents 243 created here is not particularly prescribed. As an output, a registration handle created by the FMS 242 is returned. In the present embodiment, the contents is called from the FLL 143 but the present invention can of course be practiced by so implementing calling of a contents from the FLE 343 on extension of the DBMS transaction.

(2) A contents registration stop function is for invalidating a registration handle. As an input, the registration handle acquired with the aforementioned contents registration preparation function is designated. When a DB managed contents 243 related to that registration handle is not registered in the DBMS 342 and besides the transaction is not started, the registration handle is released and the DB managed contents 243 is deleted.

(3) A link registration function is to place a link to a contents designated by a registration handle 4300 (described later) in temporary registration condition. As an input, a transaction identifier of the DBMS 342 and a path name (file name or directory name) of a link registration target contents are designated. The link to the designated DB managed contents 243 is placed in temporary registration condition and commit or rollback wait condition is established in the FMS 242.

(4) A link delete function is for placing a link to a contents in temporary delete condition. As an input, a transaction identifier of the DBMS 342 and a path name (file name or directory name) of a link delete target contents are designated. The link to the designated DB managed contents 243 is placed in temporary delete condition and commit or rollback wait condition is established in the FMS 242.

(5) A link destination update function is for updating the content of a contents. As an input, a transaction identifier of the DBMS 342 and an update handle are designated. The content update for the designated DB managed contents 243 is placed in temporary registration condition and commit or rollback wait condition is established in the FMS 242.

(6) A transaction settling function is to settle link registration, link delete and content update for an external contents. As an input, a transaction identifier of the DBMS 342 is designated.

(7) A transaction invalidation function is to invalidate link registration, link delete and content update for an external contents. As an input, a transaction identifier of the DBMS 342 is designated.

Next, there are the following four interfaces of FMS 242 for accessing an external contents called from the DBMS external file linking library (FLL) 143.

(1) An access starting function is for starting an access session between the user program 142 and the FMS 242. As an input, a path name of a contents to be accessed stored in an access handle and a client identifier for definitely identifying the user program 142 (the client identifier being a combination of a network address of the user client 10 and an identifier of a session established by the user program 142 in relation to the network interface 13) are designated. As an output, an access identifier for definitely indicating the established session is returned. On extension of this process, the FMS 242 registers the access information in an access management table 4600 (described later).

(2) A contents attribute information acquiring function is for acquiring file attribute information concerning an external contents. As an input, the access identifier acquired in the above access starting function is designated. As an output, file structure information of the external contents is returned. As an example of the file structure information, a list of file number, file name and file size is available. The type and acquisition format of the attribute information is not particularly prescribed in practicing the present invention.

(3) A data read function is for acquiring data of a DB managed contents 243. As an input, the access identifier acquired with the aforementioned access starting function, file name, offset of a file read starting point and read length are designated. As an output, the read file data is returned.

(4) An access end function is for ending the access session started by the aforementioned access starting function. As an input, the access identifier acquired with the access starting function is designated. On extension of this process, the FMS 242 deletes the access information from the access management table 4600 (to be described later).

Finally, there are eight interfaces of the FMS 242 which are adapted to perform update of the external contents called from the DBMS external file linking library (FLL) 143. These interfaces are for retaining update difference information concerning update within the FMS 242 and are reflected on the external contents under management of the DB at the time that the transaction of the DBMS commits.

(1) An update starting function is for starting an update session between the user program 142 and the FMS 242. As an input, a path name of a contents subject to update stored in an access handle and a client identifier for definitely identifying the user program 142 (the client identifier being a combination of a network address of the user client 10 and an identifier of a session established by the user program 142 in relation to the network interface 13) are designated. As an output, an update identifier for definitely indicating the established session is returned. On extension of this process, the FMS 242 registers the access information in the access management table 4600 (to be described later).

(2) A contents attribute acquiring function is an interface for acquiring file attribute information concerning an external contents. As an input, the update identifier acquired with the aforementioned update starting function is designated. As an output, file structure information of the external contents is returned. As an example of the file structure information, a list of file number, file name and file size is available. The type and acquisition format of the attribute information is not particularly prescribed in practicing the present invention.

(3) A file creating function is for adding a file or a directory to the external contents placed under management of the DB. As an input, the update identifier acquired with the aforementioned update starting function and a name of the file or directory to be created are designated. On extension of this process, the FMS 242 registers update information of file preparation (create) in an update management table 4700 (to be described later).

(4) A file delete function is for deleting a file or directory contained in the external contents placed under management of the DB. As an input, the update identifier acquired with the aforementioned update starting function and a name of the file or directory to be deleted are designated. On extension of this process, the FMS 242 registers the update information of file delete in the update management table 4700 (to be described later).

(5) A data write function is for performing additional write or update of data for the DB managed contents 243. As an input, the update identifier acquired with the aforementioned update starting function, file name, offset of a file write starting point, write length and an area region storing the written file data are designated. On extension of this process, the FMS 242 registers the update information of file content change in the update management table 4700 (to be described later).

(6) A file moving function is to perform movement of a file in respect of the DB managed contents 243, that is, change of file name. This function can be applied to the movement of not only the file but also the directory. As an input, the update identifier acquired with the aforementioned update starting function, a file name or directory name from which the movement starts and a file name or directory name in which the movement terminates. On extension of this process, the FMS 242 registers the update information after the file movement in the update management table 4700 (to be described later).

(7) An update handle acquiring function is for acquiring an update handle related to the update session started with the aforementioned update starting function. As an input, the update identifier acquired with the edit/update starting function is designated. As an output, the update handle prepared by the FMS 242 is returned.

(8) An update ending function is for ending the updated session started with the aforementioned update starting function. As an input, the update identifier acquired with the update starting function is designated. On extension of this process, the retained session information is deleted, and log are released.

Referring now to FIGS. 5 to 9, there are shown various data structures related to the present embodiment.

FIG. 5 shows an example of data structure of the contents information file 244. One contents information file 244 is prepared in respect of one DB managed contents 243. A location where the file is prepared is not particularly prescribed so long as the location is effective to make the correspondence between the DB managed contents 243 and the contents information file 244. Reference number 4121 holds how many ones of the external file fields are from which links are set in the external file management table 4000 (FIG. 2). Directory name entry 4122 retains information of a directory contained in the contents. Stored in the entry 4122 is information such as a name of the directory (directory name) and the number of files contained in the directory (file number). File name entry 4123 retains information of a file contained in the contents. Stored in the entry 4123 is information such as a file name and a file size. Even when the correspondence between one contents information file 244 and a plurality of DB managed contents 243 is made with the aim of improving storage efficiency, the present invention can of course be practiced.

FIG. 6 shows a data structure of the registration handle 4300 and data structures of access handle 4400 and update handle 4500.

The registration handle 4300 is created with the contents registration preparation function of the DBMS external file management system (FMS) 242. The registration handle consists of two fields of FMS identifier 4311 and directory path 4312. Set in the FMS identifier 4311 is an identifier of an FMS 242 that has created the registration handle of interest. Set in the directory path 4312 is a directory path related to the DB managed contents 243. When the contents is designated as one file, a full path of the file is set and when the contents is designated as a directory, a full path of the directory is set.

The access handle 4400 is created in the external file linking function extension (FLE) 343 and is given, as a return value of the file abstract data type function get_accesshandle( ), to the user program 142. The access handle consists of two fields of FMS identifier 4411 and directory path 4412. Set in the FMS identifier 4411 is an identifier of an FMS 242 managing a contents to be accessed. Set in the directory path 44112 is a directory path of the contents to be accessed. When the contents is registered for linking as one file, a full path of the file is set and when the contents is registered for linking as a directory, a full path of the directory is set.

The update handle 4500 is created by the update handle acquiring function of the DBMS external file management system (FMS) 242 and given to the user program 142. The update handle consists of three fields of FMS identifier 4511, directory path 4512 and serial number 4513. Set in the FMS identifier 4511 is an identifier of an FMS 242 managing a contents to be updated. Set in the directory path 4512 is a directory path of the contents to be updated. When the contents is registered for linking as one file, a full path of the file is set and when the contents is registered for linking as a directory, a full path of the directory is set. Set in the serial number 4513 is an identifier of update used as a key by the update management table 4700 (to be described later).

Figure 7:
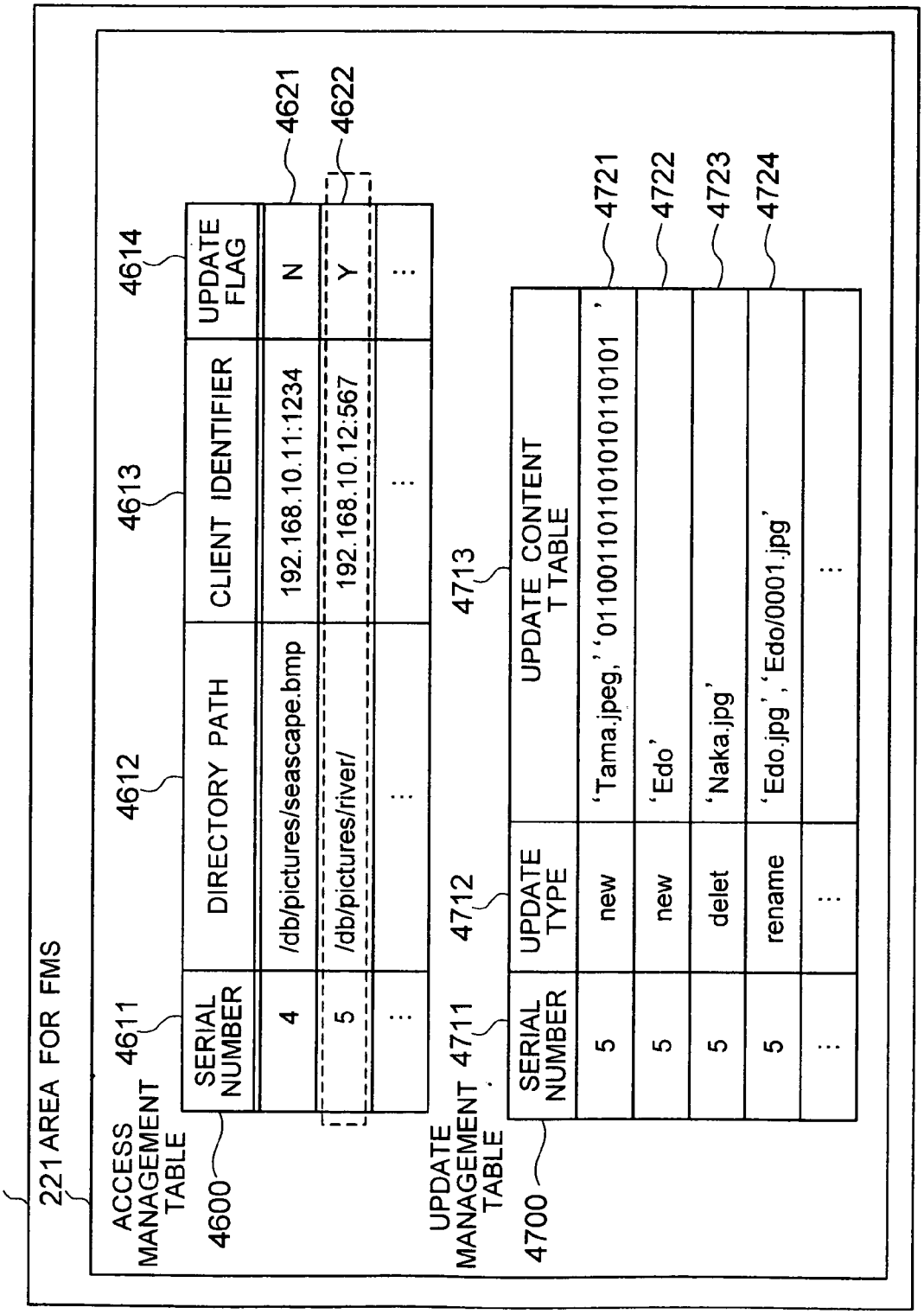
FIG. 7 is a diagram showing an example of a data structure on a memory used by the DBMS external file management system (FMS).

Referring to FIG. 7, there is illustrated an example of a data structure of management information related to the user client 10 and being stored in an area 221 on memory 22 assured by the DBMS external file management system (FMS) 242. An upper portion is a data structure concerning management of sessions of access to the external contents and a lower portion is a data structure concerning management of update sessions applied to the external contents. Access session management information is managed by means of the access management table 4600. Update session management information is managed with the update management table 4700.

The access management table 4600 consists of four fields of serial number 4611, directory path 4612, client identifier 4613 and update flag 4614. When the access starting function or update starting function of the DBMS external file management system (FMS) 242 is called to start an access session or update session applied to the external contents, a new record is registered in the access management table 4600. The serial number 4611 is for identifying a session and is set with a definite value when the session starts. Set in the directory path 4612 is a path name designated during input of the function. Set in the client identifier 4613 is a client identifier designated during input of the function. The update flag 4614 is set with N in the case of access starting function and is set with Y in the case of update starting function to decide whether the session is for reference only or is concomitant with update.

The update management table 4700 consists of three fields of serial number 4711, update type 4712 and update content 4713. The value of serial number 4711 corresponds to the serial number 4611 in the access management table 4600, so that by combining the access management table 4600 with the update management table 4700 through the serial number, it can be identified which user program makes a request for update. A combination of the update type 4712 and update content 4713 indicates the concrete content of update. A record designated at 4721 indicates that a file is newly created with data stored subsequently to a file name 'Tama. jpeg' in update content 4713, under a directory path '/db/pictures/river/' designated at 4622. In the case of update of the content of existing files, this format also stands. When data in file is updated midway, a format may be employed in which an offset of update position is added to the update content 4713. A record designated at 4722 indicates that a directory 'Edo' is created under the directory path '/db/pictures/river/' designated at 4622. A record designated at 4723 indicates that a file 'Naka. jpg' is deleted under the directory path '/db/pictures/river/' designated at 4622 is deleted. A record designated at 4724 indicates that a file 'Edo. Jpg' is renamed (movement) to '/db/pictures/river/Edo/0001. jpg' under the directory path '/db/pictures/river/' designated at 4622.

In the present embodiment, the update management table 4700 is totally retained on the memory but even when this table is so implemented as to be partly stored on the secondary storage, the present invention can of course be practiced.

Figure 8:
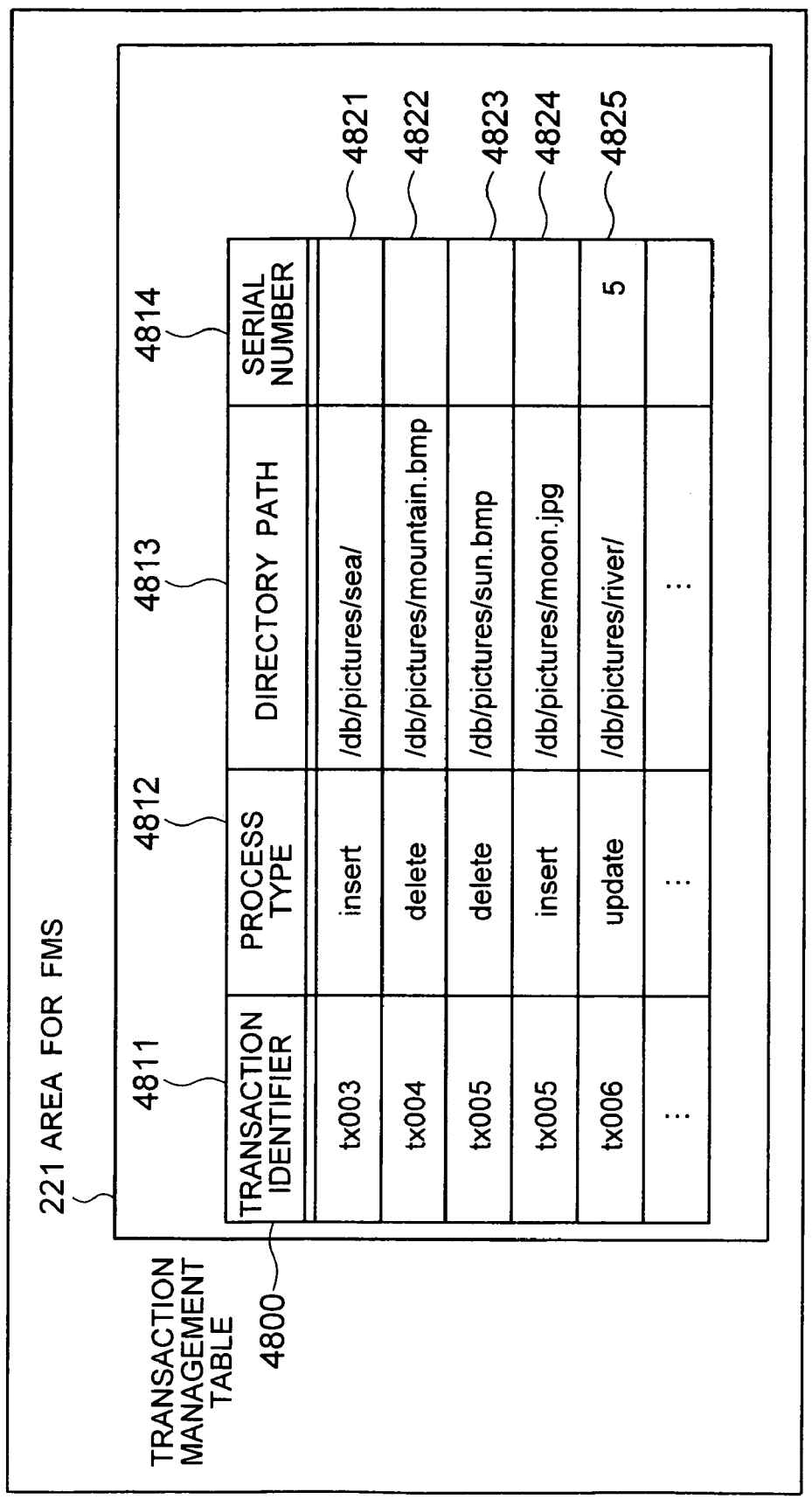
FIG. 8 is a diagram showing an example of a data structure on the memory used by the DBMS external file management system (FMS).

Referring to FIG. 8, there is illustrated an example of a data structure of management information related to the transaction of DBMS 342 and being stored in the area 221 on memory 22 assured by the DBMS external file management system (FMS) 242.

A transaction management table 4800 consists of four fields of transaction identifier 4811, process type 4812, directory path 4813 and serial number 4814. The transaction identifier 4811 is an identifier for definitely indicating a transaction of the DBMS 342. The process type 4812 is sorted into three kinds of insert (link registration), delete (link delete) and update (link destination update). The directory path 4813 is a full path of a link destination contents related to update. The serial number 4814 is meaningful only when the process type 4812 is update and is set with the same value as that in the serial number 4611 of access management table 4600 and in the serial number 4711 of update management table 4700. In FIG. 8, indicated at 4821 is an example where a directory '/db/pictures/sea/' is registered as a link destination contents under a transaction tx003 and indicated at 4822 is an example where a link to a file 'db/pictures/mountain. bmp' is deleted under a transaction tx004. Indicated at 4823 and 4824 is an example where a link to a file '/db/pictures/sun. bmp' is deleted with an UPDATE statement and instead a file 'db/pictures/moon. jpg' is registered as a link destination contents. Indicated at 4825 is an example where contents following the directory '/db/pictures/ river' are updated on the basis of the update information indicated by access serial number 5 in the update management table 4700.

Of log records of DBMS 342 stored in the log 345, an external file log 4900 acquired by the external file linking function extension (FLE) 343 has a data structure as exemplified in FIG. 9. In the FLE 343, when the external file 4013 is updated during registration, delete and update of the record in the transaction, the identifier of the DBMS external file management system (FMS) 242 is recorded in the external file log 4900 by using a log acquiring function of the DBMS 342. This permits the FLE 343 to communicate with the FMS 242 during commit or rollback so as to inform the settled results of the DBMS transaction, thereby ensuring that referential matching between the external file table 4000 and the external contents can be guaranteed.

The external file log 4900 consists of two fields of transaction identifier 4911 and FMS identifier 4912. Set to the transaction identifier 4911 is an identifier of a transaction belonging to an update process giving a chance of acquiring a log to the external file log 4900. Set to the FMS identifier 4912 is an identifier of an FMS related to the DBMS transaction. When a record having the same pair of transaction identifier 4911 and FMS identifier 4912 has already been registered, the log is not delivered to the external file log 4900 in order to exclude overlapping.

Figure 12:
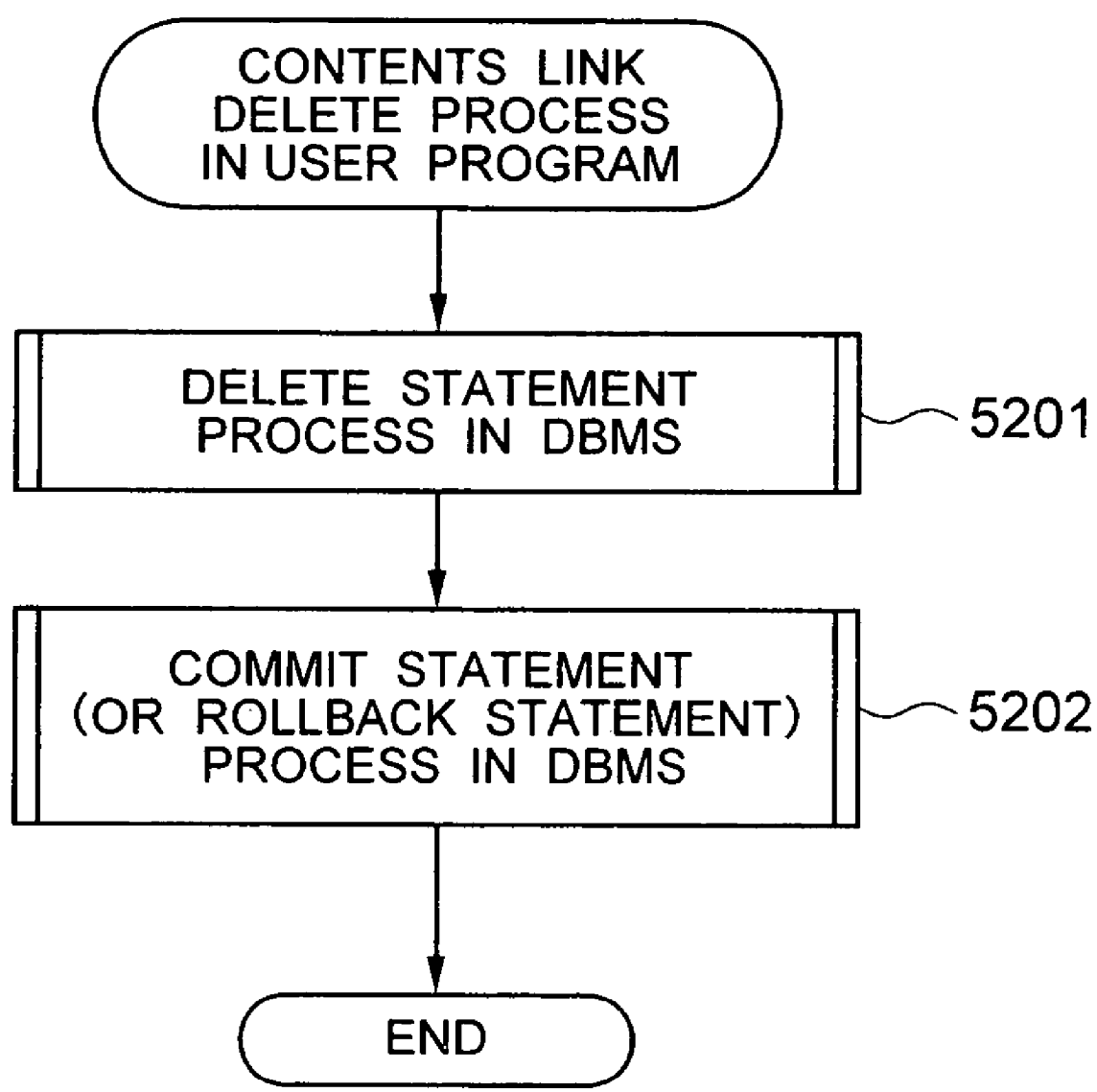
FIG. 12 is a flow chart of a contents link deleting process in the user program.
Figure 13:
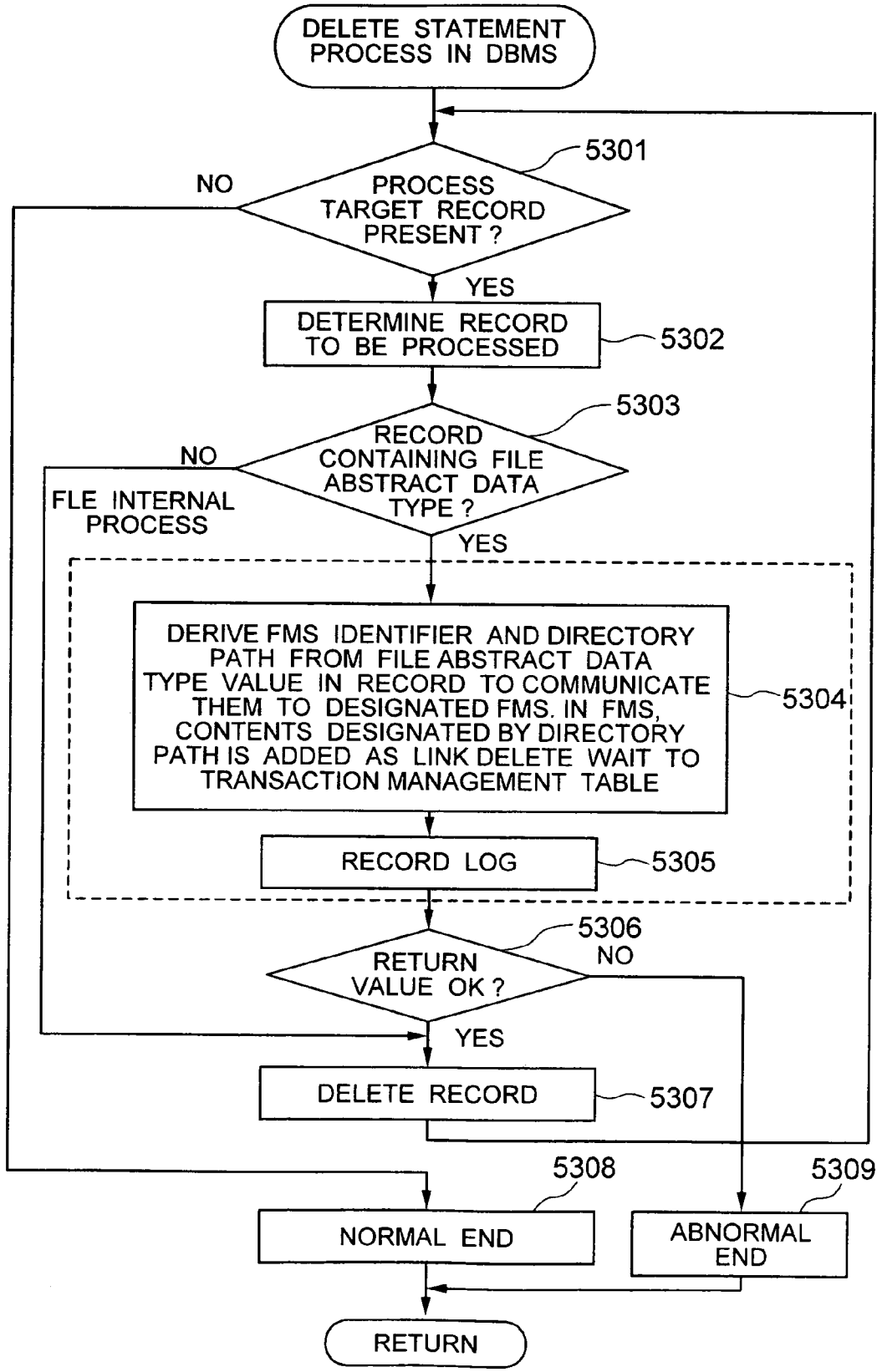
FIG. 13 is a flow chart of a DELETE statement in the DBMS.
Figure 14:
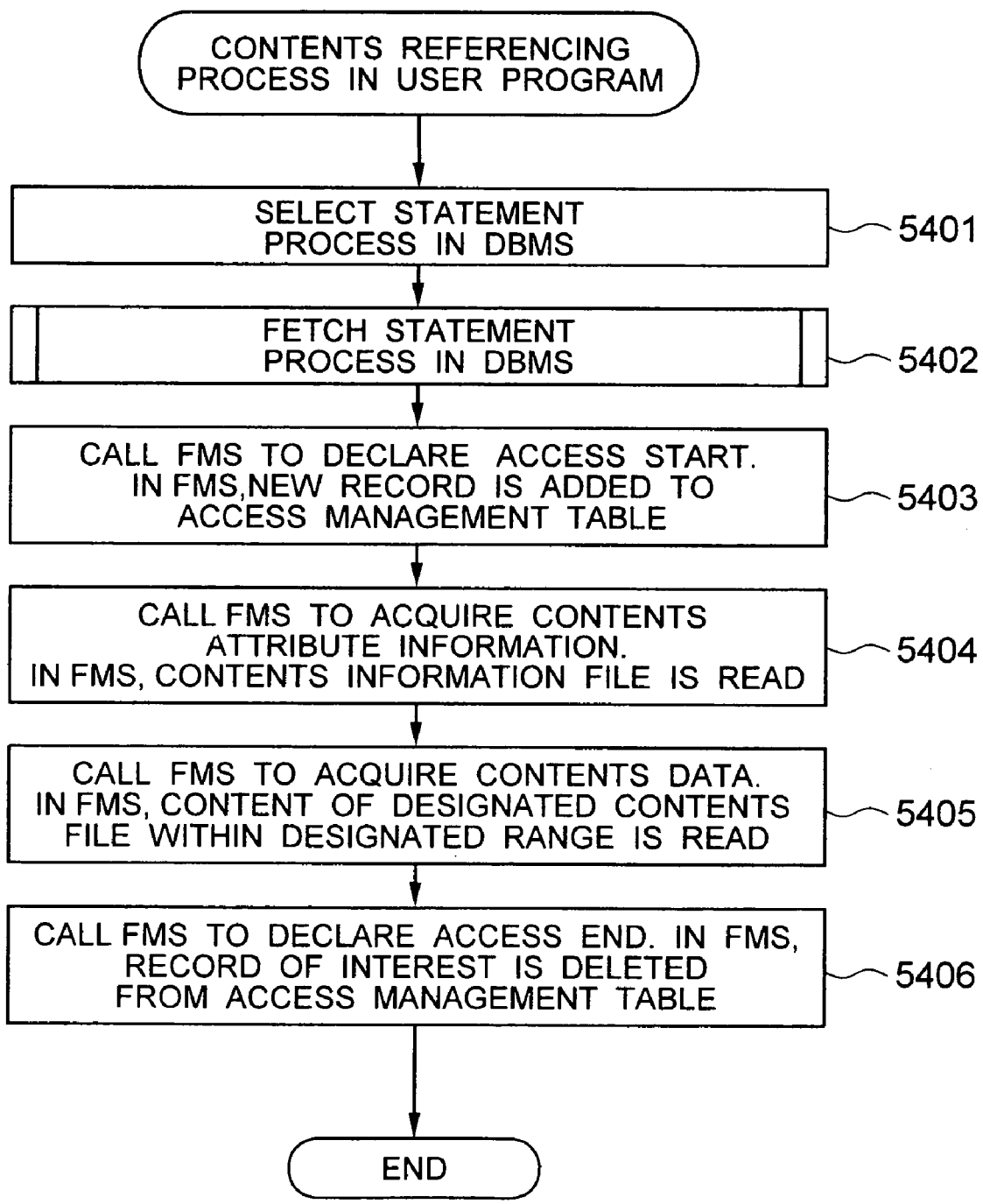
FIG. 14 is a flow chart of a contents referencing process in the user program.
Figure 15:
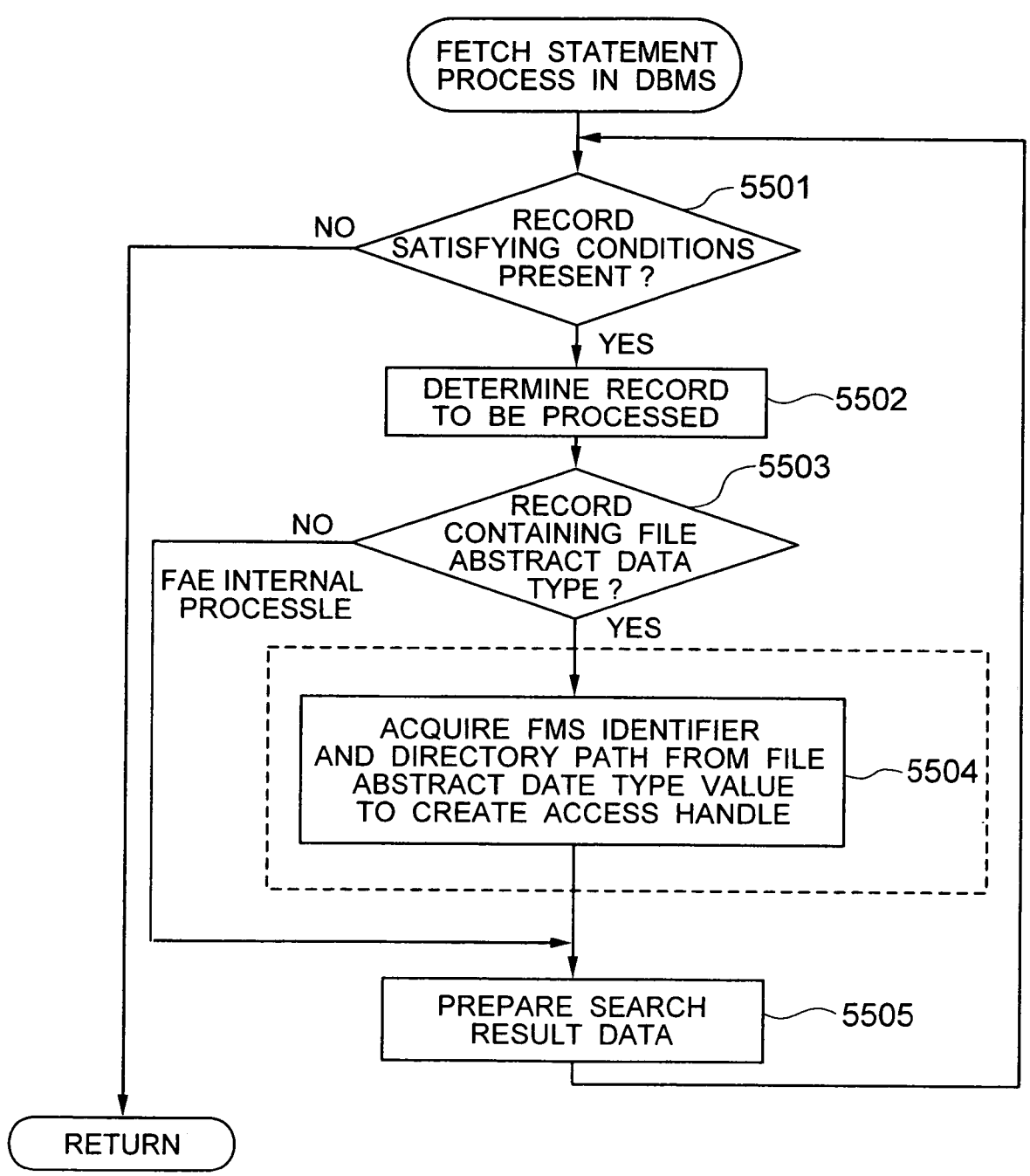
FIG. 15 is a flow chart of a FETCH statement process in the DBMS.
Figure 16:
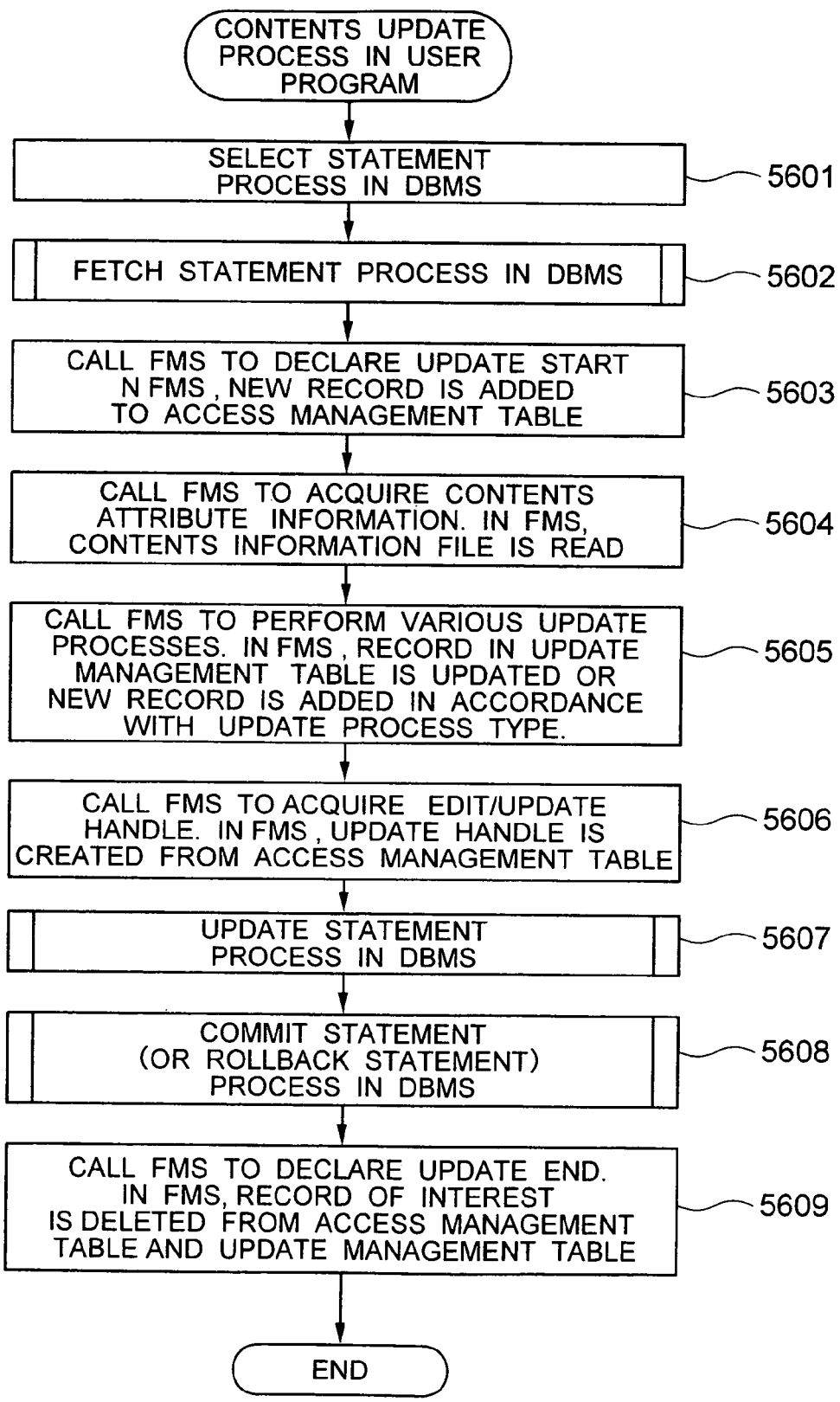
FIG. 16 is a flow chart of a contents update process in the user program.
Figure 17:
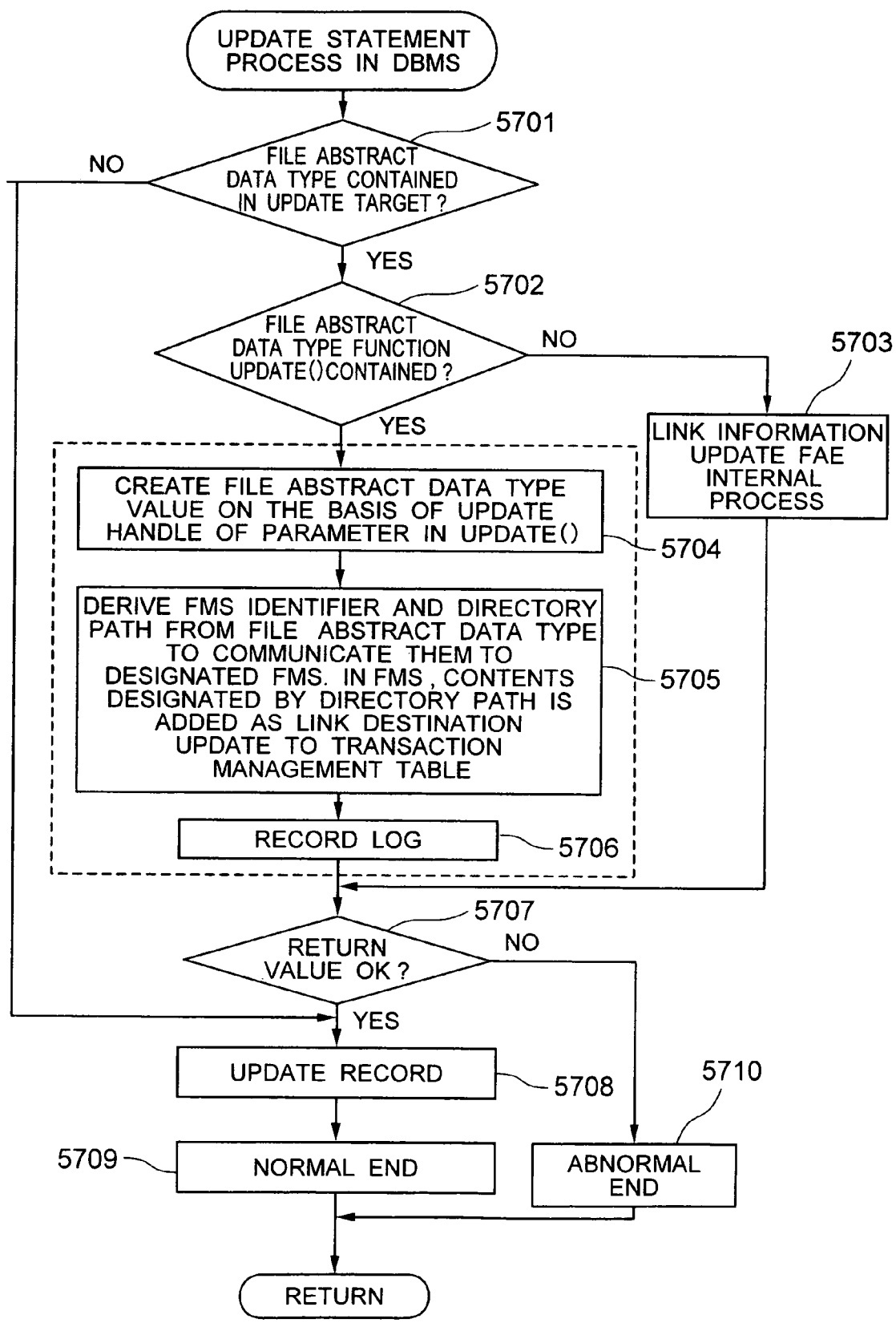
FIG. 17 is a flow chart of an UPDATE statement process in the DBMS.
Figure 18:
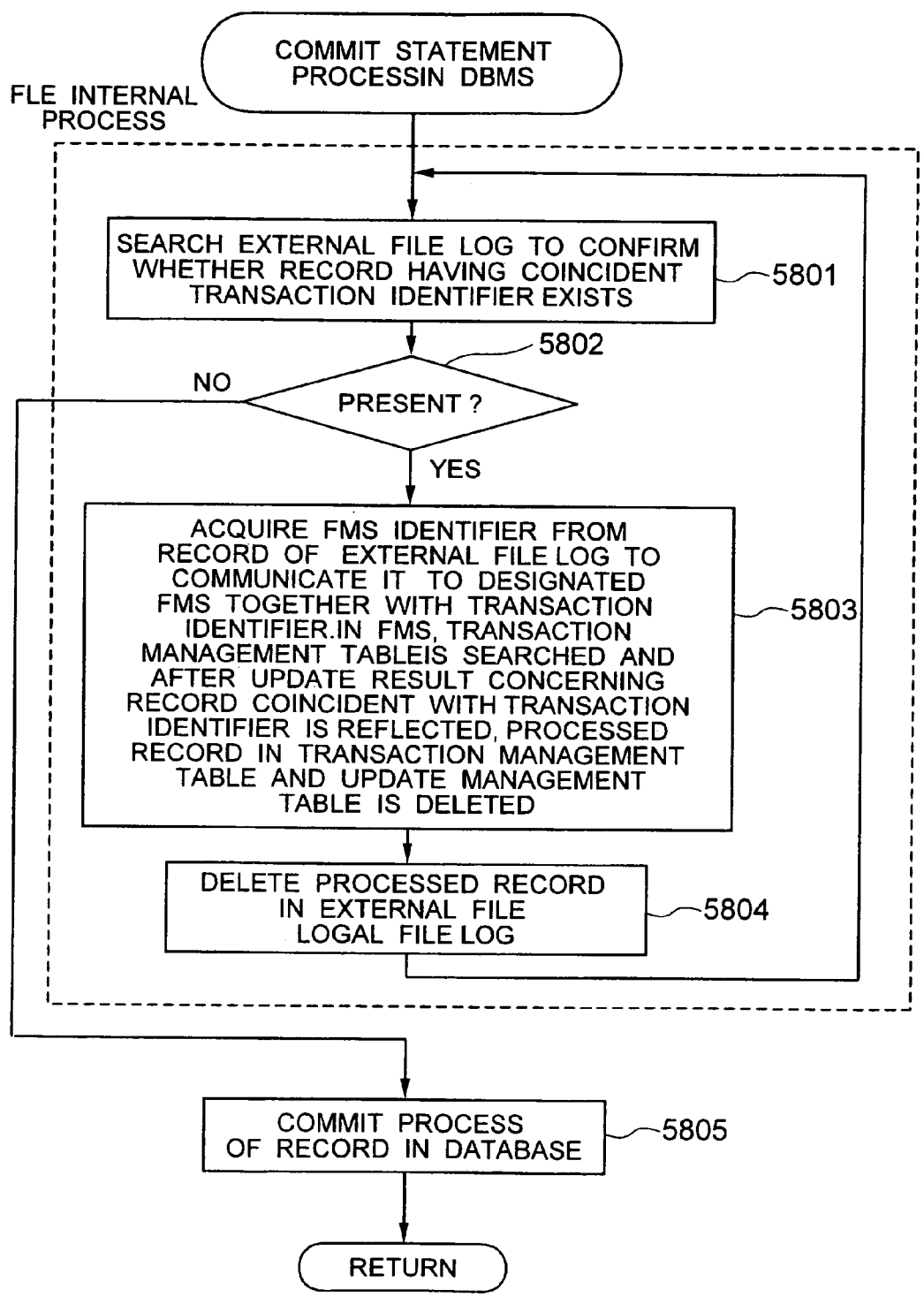
FIG. 18 is a flow chart of a COMMIT statement process in the DBMS.
Figure 19:
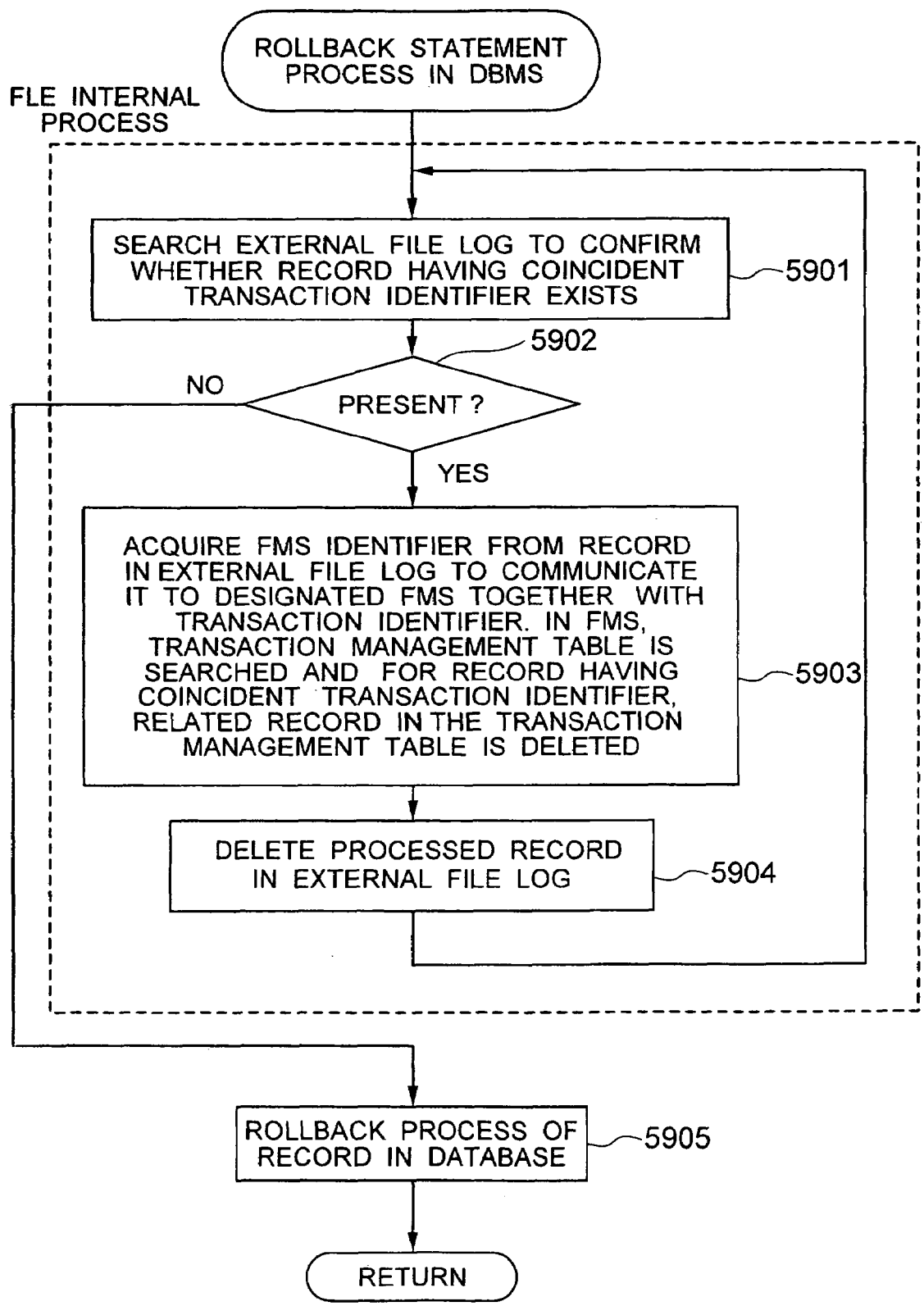
FIG. 19 is a flow chart of a ROLLBACK statement process in the DBMS.

Flow charts of FIGS. 10 to 19 show the flow of processes related to the present embodiment. A process for registering a link to a contents is depicted in FIGS. 10 and 11. A process for deleting a link to a contents is depicted in FIGS. 12 and 13. A process for referencing a contents is depicted in FIGS. 14 and 15. A process for updating a link destination contents is depicted in FIGS. 16 and 17. A transaction commit process is depicted in FIG. 18. A transaction rollback process is depicted in FIG. 19. A ROLLBACK statement process shown in FIG. 19 is the same as a process during a transaction rollback caused when the DBMS 342 becomes faulty or the user program ends without authorization.

The procedure for the user program 142 to register for linking a registration target contents 144 to the DBMS 342 will be described on the basis of flow charts of FIGS. 10 and 11.

The procedure starts from FIG. 10. In step 5001, the user program 142 calls the contents registration preparation function of the FMS 242 via the FLL 143 to make a request for registration preparation of a registration target contents 144 on the user client 10. In the FMS 242, file data is extracted from an input parameter and a DB managed contents 243 is created by using an OS file accessing control information setting function offered by the OS 241 after setting to the OS file access controlling information 245 a signification to the effect that the contents is possessed by the FMS. When a plurality of files are handed over, a plurality of files are prepared as DB managed contents 243. A registration handle 4300 is created and is returned to the user program 142 as an output parameter.

Subsequently, in step 5002, the user program 142 registers a new record in the external file management table 4000 by using an INSERT statement of the format shown at (1) in FIG. 4 (as the variable entryhandle, the register handle 4300 acquired in the step 5001 is designated).

Turning to FIG. 11, the DBMS 342 receiving the request from the user program 142 executes an INSERT statement process. Firstly, in step 5101, the new record 4023 is created. Through this, record identifier 4001 of the new record 4023 is settled. Thereafter, in step 5102, definition information of the record 4023 is referenced to decide whether the file abstract data type function new( ) is contained. If not contained, the program proceeds to step 5107. If contained, a process concerning the file abstract data type is subsequently carried out in the FLE 343.

In step 5103, new( ) in the INSERT statement is first processed. In the new( ), a file abstract data type value is prepared on the basis of the registration handle. In this example, the registration target contents is a file, file is set in the contents format 4016.

Thereafter, in step 5104, a contents link registering process in the FLE 343 is called. At that time, the transaction identifier and the file abstract data type value are handed over as a parameter. In the contents link registering process, the FMS identifier, directory path and contents format are extracted from the file abstract data type value. In case the contents format is directory, a directory delimiter '/' is added to the end of the directory path. Then, in order to confirm the contents and place the link in temporary registration condition, the link registration function of the FMS 242 is called. The FMS 242 called in this phase is one indicated by the FMS identifier of file abstract data type value. As an input parameter at that time, an identifier of the current transaction of the DBMS 342 and a directory path are designated. In the FMS 242, it is confirmed that a file exist under the directory path designated by the input parameter and at the same time, a contents information file 244 is also created. In the transaction management table 4800, insert is set at update type 4812 to add an entry together with the transaction identifier and directory path.

In step 5105, a new log record is prepared in the external file log 4900 by utilizing the log recording function of the DBMS 342 and the transaction identifier and FMS identifier are recorded.

In case the contents registering process of the FLE 343 does not end in subsequent step 5106, the program proceeds to step 5109 where the DBMS 342 also ends the process of INSERT statement abnormally. In the case of normal end, the prepared file abstract data type value is written to external file 4013 of the record 4023 and the INSERT statement process ends normally in step 5108.

Reverting to FIG. 10, a commit process or rollback process is carried out in step 5003 by the DBMS 342 in response to a commit process request or rollback process request from the user program 142 and a transaction ends. This process will be described later.

Finally, in order to release the registration handle after completion of the DBMS process, the user program 142 calls the FMS 242 for the contents registration stopping function via the FLL 143 in step 5004. At that time the registration handle is handed over as an input parameter. In the FMS 242, it is confirmed whether the external contents related to the registration handle is unregistered. If the link has been set or a transaction of link setting is on the way, nothing is done. Otherwise, the file and directory created with the contents registration preparation function are deleted.

In the manner described so far, the process for link registration to the external contents ends.

In connection with the contents link registration process, the registration target contents 144 has been described as being on the user client 10 but in some applications, contents-placed on the file server 20 is desired to be placed under management of the DB in advance. In this case, transfer of file data is not carried out at the time that the contents registration preparation function of the FMS 242 is called but only OS file accessing control information 245 of the designated contents may be updated to determine the FMS 242 as a possessor and the contents as it is may be treated as a DB managed contents 243.

The procedure for the user program 142 to delete a link of a contents 244 under management of the DBMS 342 will be described on the basis of flow charts of FIGS. 12 and 13.

Starting with FIG. 12, in step 5201, the user program 142 makes a request for deleting a record 4023 registered in the DBMS 342 and a DB managed contents 243 managed by the record by using a DELETE statement of the format at (2) in FIG. 4.

Turning to FIG. 13, processing of the DELETE statement is executed in the DBMS 342 called from the user program 142. Firstly, in step 5301, a record satisfying conditions in a WHERE phrase of the designated DELETE statement is confirmed and in the absence of the record, the program proceeds to step 5308 where the DELETE statement process ends normally. In the presence of the record, the record to be processed is determined in step 5302.

In subsequent step 5303, it is decided on the basis of definition information of the record whether this record contains a field of file abstract data type and if the file is not contained, the program proceeds to step 5307. If the file is contained, a process concerning the file abstract data type is carried out in the FLE 343.

In step 5304, a contents link delete process in the FLE 343 is called. At that time, as an input parameter, an identifier of the current transaction of DBMS 342 and a file abstract data type value are handed over. In the FLE 343, the link delete function of the FMS 242 is called on the basis of a FMS identifier and a directory path acquired from the file abstract data type value. In the FMS 242, delete is set at update type 4812 in the transaction management table 4800 and an entry is added together with the transaction identifier and directory path handed over as the input parameter.

Subsequently, in step 5305, a new log record is created in the external file log 4900 by utilizing a log recording function of the DBMS 342 and the transaction identifier and FMS identifier are recorded. In step 5306, it is decided whether the internal process of the FLE 343 ends normally and if not normal, the program proceeds to step 5309 so as to end abnormally. If normal, the program proceeds to the step 5307.

In the step 5307, the record of the database is deleted and thereafter, the program returns to the step 5301 to sequentially proceed with another record delete process. If a record to be processed does not remain, the DELETE statement process in the DBMS ends.

Reverting to FIG. 12, the commit process or rollback process is subsequently carried out, in step 5202, by the DBMS 342 in response to a commit process request or rollback process request from the user program 142 and a transaction ends. This process will be described later.

In the manner described so far, the link delete process of the external contents ends.

In the UPDATE statement in SQL, the link information can be replaced with different one by overwriting the value of the former file abstract data type with a value of a different file abstract data type. This can be achieved by carrying out the aforementioned process for DELETE statement and process for INSERT statement simultaneously inside the FLE 343. In this case, the records designated at 4823 and 4824 in FIG. 8 are prepared in the transaction management table 4800.

The procedure for the user program 142 to reference a contents 243 under management of the DBMS 342 will be described on the basis of flow charts of FIGS. 14 and 15.

Starting with FIG. 14, in step 5401, the user program 142 uses a SELECT statement of the format at (5) in FIG. 4 to request the DBMS 342 to create selection conditions for a record and an access handle 4400 and the DBMS 342 receiving this request processes the SELECT statement.

Subsequently, in step 5402, the user program requests the DBMS 342 to execute a FETCH statement in order to acquire a result of the SELECT statement. Receiving the request from the user program 142, the DBMS 342 executes a FETCH statement process.

Turning to FIG. 15, in step 5501, it is decided whether there is a record, as a result of search, that satisfies conditions and in the absence of the record, the FETCH statement process ends and the program returns. In the presence of the record, the program proceeds to step 5502 where the record to be processed is determined. In step 5503, it is decided on the basis of definition information of this record whether the record contains a field of file abstract data type and if the file is not contained, the program proceeds to step 5505. If the file is contained, the program proceeds to step 5504 where a process concerning the file abstract data type is carried out in the FLE 343.

In the internal processing of the FLE 343, an access handle creating process get_accesshandle( ) is called. At that time, as an input parameter, a file abstract data type value is handed over. In the FLE 343, an FMS identifier and a directory path are derived from the file abstract data type value to create an access handle 4400.

In step 5505, the thus prepared access handle 4400 is set to an output result together with other search result data. Next, the program returns to the step 5501 where the above process is repeated until the record satisfying the conditions in the SELECT statement runs out. When the record disappears, the FETCH statement process ends.

Reverting to FIG. 14, in step 5403, the access starting function of the FMS 242 is called via the FLL 143 in order to start an access to an external contents after the access handle has been acquired. The call destination FMS 242 is determined dynamically with an FMS identifier 4411 of the access handle 4400. An input parameter includes a directory path 4412 in the access handle 4400 acquired with the aforementioned SELECT statement and a client identifier of the user program 142 (a combination of the network address of the user client 10 and an identifier of a session established by the user program 142 in relation to the network interface 13 or the like). In the FMS 242, an entry, in which N is set at the update flag 4614 and the directory path and client identifier of the input parameter are set at the directory path 4612 and client identifier 4613, respectively, in the access management table 4600, is prepared and the access identifier is returned to the user program 142.

Thereafter, for the sake of acquiring information concerning a contents corresponding to the access handle 4400, the contents attribute information acquiring function of the FMS 242 is called via the FLL 143 in step 5404 and information concerning the DB managed contents 243 is acquired. Set to the input parameter is the access identifier acquired with the aforementioned access starting function. In the FMS 242, a directory path is acquired from the access management table .4600 on the basis of the access identifier of the input parameter, a corresponding contents information file 244 is read and the read attribute information is returned to the user program 142.

Subsequently, on the basis of the attribute information acquired in the step 5404, a file name is designated to perform reading of file data. In step 5405, the data reading function of the FMS 242 is called via the FLL 143 to read file data of the DB managed contents 243. In addition to the access identifier acquired through calling of the access starting function, read name, offset position inside the file and read data size are set in the input parameter. In the FMS 242, a directory path is acquired from the access management table 4600 on the basis of the access identifier of the input parameter. The acquired directory path is added with the file name designated as the input parameter so as to read the file data and the read data is returned to the user program 142.

At the time that referencing the contents ends, an access end process is carried out. More particularly, in step 5406, the access end processing function of the FMS 242 is called via the FLL 143 and an access identifier is designated as an input parameter. In the FMS 242, the access management table 4600 is searched and a record consistent with the access identifier is deleted. Through this, locking applied to the external contents by the FMS 242 is released.

In the manner described so far, the contents referencing process in the user program ends.

It is to be noted that the commit process or rollback process accompanying the SELECT statement can be executed by causing the user program 142 to issue a request at any time point which succeeds calling of the access starting function of the FMS 242.

In the contents referencing process of the FLL 143, a method of acquiring data in the file format on the secondary storage 14 of the user client 10 may be employed in place of reading data on the memory of the user program 142. This can be implemented by defining an interface for file acquisition on the FLL 143. The acquisition destination being either on the memory or on the secondary storage does not matter in practicing the present invention.

The procedure for the user program 142 to update the content of a contents 243 under management of the DBMS 342 will be described on the basis of flow charts of FIGS. 16 and 17.

Starting with FIG. 16, in step 5601, the user program 142 uses a SELECT statement of the format at (5) in FIG. 4 to request the DBMS 342 to create selection conditions for a record and an access handle 4400 and the DBMS receiving this request processes the SELECT statement.

Subsequently, in step 5602, the user program requests the DBMS 342 to execute a FETCH statement for the sake of acquiring a result of the SELECT statement. Receiving the request from the user program 142, the DBMS 342 executes the FETCH statement process. (The content of the FETCH statement process is shown in FIG. 15).

After an access handle has been acquired, the user program calls the update starting function of the FMS 242 via the FLL 143 in order to start update for an external contents in step 5603. The calling destination FMS 242 is dynamically determined by means of an FMS identifier 4411 of the access handle 4400. An input parameter includes a directory path 4412 in the access handle 4400 acquired with the aforementioned SELECT statement and a client identifier (a combination of a network address of the user client 10 and an identifier of a session established by the user program 142 in relation to the network interface 13) of the user program 142. In the FMS 242, an entry, in which Y is set at update flag 4614 and the directory path and client identifier of the input parameter are set at directory path 4612 and client identifier 4613, respectively, in the access management table 4600, is. created and the update identifier is returned to the user program 142.

Thereafter, in order to acquire information concerning a contents corresponding to the access handle 4400, the contents attribute information acquiring function of the FMS 242 is called via the FLL 143 in step 5604 and information concerning the DB managed contents 243 is acquired. Set to the input parameter is an update identifier acquired with the update starting function. In the FMS 242, a directory path is acquired from the access management table 4600 on the basis of the update identifier of the input parameter, a corresponding contents information file 244 is read and the read attribute information is returned to the user program 142.

Subsequently, various update processes are applied to the external contents on the basis of the attribute information acquired in the step 5604. In step 5605, processes such as file (or directory) preparation, file (or directory) delete, write to file and file (or directory) rename are carried out.

In file (or directory) creation, the file creating function of the FMS 242 is called via the FLL 143 and a DB managed contents 243 is newly created. As an input parameter, the update identifier acquired with the update starting function and name of a file (or directory) to be prepared newly are designated. In the FMS 242, an entry having new at update type is added to the update management table 4700.

In file (or directory) delete, the file delete function of the FMS 242 is called via the FLL 143 and a DB managed contents 243 is deleted. As an input parameter, the update identifier acquired with the update function and name of a file (or directory) to be deleted are designated. In the FMS 242, an entry having delete at update type is added to the update management table 4700.

In write to file, the file write function of the FMS 242 is called via the FLL 143 and the content of a DB managed contents 243 is updated. As an input parameter, the update identifier acquired with the update starting function, name of a file to be written, offset position inside the file, written data size and written data storing area are designated. In the FMS 242, an entry having new at update type is added to the update management table 4700 and a file image as a result of update is registered in the table 4700.

In file (or directory) name change, the file moving function of the FMS 242 is called via the FLL 143 and the name of a DB managed contents 243 is changed. As an input parameter, the update identifier acquired with the update starting function, name of a file (or directory) to be renamed and name after rename are designated. In the FMS 242, an entry having rename at update type is added to the update management table 4700.

After various update processes described as above have been completed, an update handle is acquired in step 5606. The update handle acquiring function is called via the FLL 143 and an update handle related to the external contents is acquired. Set to an input parameter is the update identifier acquired with the update starting function. In the FMS 242, an update handle 4500 is created from the access management table 4600 and is returned to the user program 142.

Returning to step 5607, the user program 142 subsequently uses an UPDATE statement of the format at (4) in FIG. 4 (as variable : updatehandle, the update handle 4500 acquired in the step 5306 is designated) to update the value of external file 4013 in the record in external file management table 400 of the DBMS 342 and place the DB managed contents 243 in temporary update condition on extension of the DBMS transaction.

Turning to FIG. 17, the DBMS 342 receiving a request from the user program 142 executes an UPDATE statement process. Firstly, in step 5701, it is decided whether the file abstract data type is contained in an object to be updated. If the file abstract data type is not contained, the process is deemed as usual record update and the program proceeds to step 5708. In case the file abstract data type is contained, it is decided in subsequent step 5702 whether the process is for update of the content of the link destination. If an update parameter setting function update( ) is not designated, the process is not for update of the content of the link destination and the program proceeds to step 5703 where an update process is executed for only usual link information.

In the case of link destination content update, a process concerning the file abstract data type is carried out in the FLE 343 in step 5704 and the ensuing steps. Firstly, an update parameter setting function update( ) of the FLE 343 is called. At that time, as a parameter, an update handle is handed over. In update( ), a file abstract data type value is created on the basis of the update handle.

Thereafter, in step 5705, a contents update process of FLE 343 so related as to be called during UPDATE statement process is called. At that time, as a parameter, a transaction identifier and the update handle are handed over. In the FLE 343, an FMS identifier, a directory path and the contents format are extracted from the update handle. In case the contents format is directory, a directory delimiter '/' is added to the end of the directory path. Then, in order to confirm the contents and place the content update in temporary registration condition, the link destination update function of the FMS 242 is called. In this phase, the called FMS 242 is one indicated by the FMS identifier of the file abstract data type value. As an input parameter at that time, an identifier of the current transaction of the DBMS 342 and the update handle are designated. In the FMS 242, by referencing the update management table 4700, it is confirmed from serial number 4513 in the update handle 4500 designated by the input parameter that the update information is registered and update is set at process type 4812 to add an entry, together with the transaction identifier, directory path and serial number, to the transaction management table 4800. The directory path and serial number are those acquired from the update handle.

In step 5706, the log recording function of the DBMS 342 is utilized to prepare a new log record in the external file log 4900 and the transaction identifier and FMS identifier are recorded.

If the contents update process of the FLE 343 has not ended normally in subsequent step 5707, the program proceeds to step 5710 where the DBMS 342 also ends the UPDATE statement process abnormally. In the case of normal end, the file abstract data type value prepared in the step 5704 is written to the record to be updated in the step 5708 and the UPDATE statement process is caused to end normally in step 5709.

Reverting to FIG. 16, a commit or rollback process is carried out in step 5608 by the DBMS 342 in response to a commit process request or rollback process request from the user program 142 and a transaction ends. This process will be describe later.

Finally, in step 5609, the update ending function of the FMS 242 is called via the FLL 143 in order to end the update process after the DBMS process has ended. As an input parameter, the updated identifier acquired through the calling of the update starting function is handed over. In the FMS 242, the record concerned is deleted from the access management table 4600 and update management table 4700 on the basis of the serial number 4513 in the update identifier handed over in the form of the input parameter.

In the manner described so far, the update process of the external contents ends.

A transaction commit process will be described on the basis of a flow chart shown in FIG. 18.

In a COMMIT statement process of the DBMS 342, a commit process of the FLE 343 is first called. At that time, as an input parameter, a transaction identifier of a transaction to be committed is handed over.

Firstly, in step 5801, a record having a transaction identifier 4911 coincident with the transaction identifier handed over in the form of the input parameter is searched. If the coincident identifier is not found in step 5802, the commit process of the FLE 343 ends.

If the coincident identifier is found, a FMS identifier 4912 is acquired from the record of external file log 4900 and the transaction settling function of the FMS 242 is called in step 5803. At that time, the transaction identifier is designated as an input parameter. In the FMS 242, the transaction management table 4800 is searched and it is examined whether a record having the transaction identifier designated by the input parameter exists. If the consistent record exists, it is sequenced in the order of the kinds at process type 4812 so as to be subjected to a settling process.

Firstly, a transaction having insert at the process type is settled. Concomitantly with the settling process, the number of reference number 4121 in the contents information file 244 is incremented by one. Subsequently, a transaction having update at the process type is settled. When the former reference number 4121 in the contents information file 244 is one at the time of the settling process, the settling process is carried out by overwriting while keeping the reference number unchanged. More specifically, the serial number 4814 in the transaction management table 4800 is used as a key to search the update management table 4700 and results of update associated with the same serial number are reflected. When the former reference number 4121 in the contents information file 244 is two or more, the reference number in the information file 244 of that contents is decremented by one while keeping the former contents unchanged in order to assure the contents of link destination for file abstract data type values of other link originators. With the aim of determining the contents on which the results of update are reflected as the link destination for the updated file abstract-data type, the DB managed contents 243 is copied in a separate way to reflect the results of update. For the contents created by copying, the reference number 4121 in the contents information file 244 is set to one. Finally, a transaction having delete at the process type is settled. Concomitantly with the settling process, the reference number 4121 in the contents information file 244 is decremented by one. When the reference number becomes 0 indicating that the link originator in the database runs out, a DB managed contents 243 and a contents information file 244 corresponding to the contents are deleted. But when an entry of the same contents exists in the access management table 4600 at that time and an access from the user program 142 continues, delete of the contents is delayed until accesses from all user programs 142 run out.

After the settling process has ended, processed records in the transaction management table 4800 and update management table 4700 are deleted.

Subsequently, in step 5804, processed records in the external file log 4900 are deleted.

In the manner described so far, the commit process in the FLE 343 ends.

In step 5805, the DBMS 342 performs a usual commit process concerning records in the database.

The flow of the commit process has been described.

When links are set to the same contents from a plurality of file abstract data type fields in the course of processing of the transaction settling function of the FMS 242, referential matching can be assured through such implementation that the reference number 4121 remains unchanged and the link destination contents is directly updated, thus permitting the present invention to be practiced even with this implementation.

A transaction rollback process will be described on the basis of a flow chart shown in FIG. 19.

In a ROLLBACK statement process of the DBMS 342, a rollback process of the FLE 343 is first called. At that time, as an input parameter, a transaction identifier of a transaction subjected to rollback is handed over.

Firstly, in step 5901, a record having a transaction identifier 4911 coincident with the transaction identifier handed over in the form of the input parameter is searched from the external file log 4900. If the coincident identifier is not found in step 5902, the rollback process of the FLE 343 ends.

If the coincident identifier is found, a FMS identifier 4912 is acquired from the record in the external file log 4900 and the transaction invalidating function of the FMS 242 is called in step 5903. At that time, as an input parameter, the aforementioned transaction identifier is designated. In the FMS 242, the transaction management table 4800 is searched and it is examined whether a record having the transaction identifier designated in the input parameter exists. In the presence of the record having the coincident identifier, the invalidation process is carried out. The record having the transaction identifier 4811 coincident with that in the input parameter in the transaction management table 4800 is deleted.

Subsequently, in step 5904, the processed record in the external file log 4900 is deleted.

In the manner described so far, the rollback process in the FLE 343 ends.

In step 5905, the DBMS 342 carries out a usual rollback process concerning records of the data-base.

The above is the flow of rollback process.

As described above, by introducing the file abstract data type and the external file linking function to the DBMS, introducing the DBMS external file management system for the purpose of managing files under management of the DBMS and setting the external file linking function and DBMS external file management system such that they can properly link with each other, it can be guaranteed that responsive to an operation applied a database record by the DBMS user, a proper operation can be applied to an external file related to the record, thereby ensuring that matching between the database record and the external file can be guaranteed and an unauthorized access to a file under management of the DBMS can be excluded.

After searching the database, the user registers update difference information concerning a registered file in the DBMS external management system and then reflects the content of update on a link destination file by means of a database transaction, with the result that even consistency of the content of the file can be managed by using the database. Through the link management combined with the reference number, the edition management of external file based on the database can also be realized.

The invention claimed is:

1. A database managing method for managing table information containing a record and data not stored in the table information, comprising:
    creating, when a request for process of said data managed by a file server is inputted in a memory of said file server, a data structure indicating the processing procedure for managing said data on the basis of position management information storing position information of said data contained in said record and said inputted request; and
    executing, when a commit process issued from a database server is carried out in a transaction for processing said process request, a process of maintaining consistency concerning said data in said file server on the basis of said data structure which includes a reference number of at least one link between records managed by said database server and contents in said file server managed in relation to said records.

2. A database managing method according to claim 1, wherein a plurality of files or a plurality of files having a directory structure are managed as a link destination in the field of a record, and the file structure and the content of the files of said link destination are updated in accordance with update of the field value in said database.

3. A database managing method according to claim 1, wherein the process for maintaining consistency is implemented such that, in respect of data not stored in the table information, position management information of said data is newly registered in the record.

4. A database managing method according to claim 1, wherein the process for maintaining consistency is implemented such that, in respect of data not stored in the table information, the position management information of said data is deleted from the record.

5. A database managing method according to claim 1, wherein the process for maintaining consistency is implemented such that, in respect of data not stored in the table information, the content of data indicative of position information stored in the position management information of said data within the record is updated.

6. A database managing method according to claim 1, wherein said reference number is incremented by one in a setting process of said transaction when said transaction is an insert transaction.

7. A database managing method according to claim 6, wherein said reference number is decremented by one in a setting process of said transaction when said transaction is a delete transaction.

8. A database managing system for managing table information containing a record and data not stored in the table information, comprising:
    create means for creating, when a request for process of said data managed by a file server is inputted in a memory of said file server, a data structure indicating the processing procedure for managing said data on the basis of position management information storing position information of said data contained in said record and said inputted request; and
    execution means for executing a process of maintaining consistency concerning said data managed by a file server on the basis of said data structure which includes reference number of at least one link between records managed by said database server and contents in said file server managed in relation to said records when a commit process issued from a database server is carried out in a transaction for processing said request.

9. A database managing method according to claim 8, wherein the number of links to the same external file is managed;
    a copy of the file is prepared and the copy is updated during update of the content of the file in a link destination file update process; and
    for only a field in a record subjected to the update process, a file after copying is set as the link destination.

10. A database managing system according to claim 8, wherein the process for maintaining consistency is implemented such that, in respect of data not stored in the table information, position management information of said data is newly registered in the record.

11. A database managing system according to claim 8, wherein the process for maintaining consistency is implemented such that, in respect of data not stored in the table information, the position management information of said data is deleted from the record.

12. A database managing system according to claim 8, wherein the process for maintaining consistency is implemented such that, in respect of data not stored in the table information, the content of data indicative of position information stored in the position management information of said data within the record is updated.

13. A database-file link method for linking table information managed by a database management system to external files, comprising the steps of:
   defining, in said table information, a field of a data structure for storing location information concerning contents of external files to be managed and a reference number of at least one link between records managed by a database server and contents in a file server managed in relation to said records and a field of file abstract data type for providing an extension process function that is an extended function for processing said information; and
   controlling an external file management system adapted to execute a process step of managing said external files by using an access right that cannot be referenced/updated by general users, on the basis of said extension process function called during an update process of said fields of the file abstract data type in said table information.

14. A database-file link method according to claim 13, wherein during a search process of a record in said table information, an access handle creating process, which is one of extension functions concerning external files managed by the fields of the file abstract data type in said record, is called and an external file managed by a field in said record is referenced using the created access handle and said external file management system.

15. A database-file link method according to claim 14, wherein a plurality of files or a plurality of files having a directory structure are managed as a link destination in the field of a record, and the file structure and the content of the files of said link destination are updated in accordance with update of the field value in said database.

16. A database-file link method according to claim 13, wherein the number of links to the same external file is managed;
   a copy of the file is prepared and the copy is updated during update of the content of the file in a link destination file update process; and
   for only a field in a record subjected to the update process, a file after copying is set as the link destination.

17. A database-file link apparatus for linking table information managed by a database management system to external files, comprising:
   means for defining, in said table information, a field of a data structure for storing location information concerning contents of external files to be managed and a reference number of at least one link between records managed by a database server and contents in a file server managed in relation to said records and a field of file abstract data type for providing an extension process function that is an extended function for processing said information; and
   means for controlling an external file management system adapted to execute a process step of managing said external files by using an access right that cannot be referenced/updated by general users, on the basis of said extension process function called during an update process of said fields of the file abstract data type in said table information.

18. A database-file link apparatus according to claim 17, further comprising means for calling, during a search process of a record in said table information, an access handle creating process that is one of extension functions concerning external files managed by the fields of the file abstract data type in said record and referencing an external file managed by a field in said record by using the created access handle and said external file management system.

19. A storage medium for storing a program related to a database-file link method for linking table information managed by a database management system to external files, the program when executed causing a processing device to perform:
   defining in advanced said table information with a field of a data structure for storing location information concerning contents of external files to be managed and a reference number of at least one link between records managed by a database server and contents in a file server managed in relation to said records; and
   defining in advance a field of file abstract data type for providing an extension process function that is an extended function for processing said information,
   wherein said program is one that is called from said extension process function called during an update process of a field of the file abstract data type in said table information to execute a process step of managing said external files by using an access right that cannot be referenced/updated by general users.

20. A database managing method for managing table information containing a record and data not stored in the table information, comprising:
   creating, when a request for process of said data managed by a file server is inputted in a memory of said file server, a data structure indicating the processing procedure based on a reference number of at least one link between records managed by a database server and contents in said file server managed in relation to said records for managing said data on the basis of position management information storing position information of said data contained in said record and said inputted request; and executing, when a commit process issued from said database server is carried out in a transaction for processing said request, a process of maintaining consistency concerning said data in said file server on the basis of said data structure which includes a reference number to said data managed by said file server and said commit process, and
   wherein a number of links to the same external file is managed, a copy of the external file is prepared and the copy is updated during an update of the content of the external file in a link destination file update process, and for only a field in a record subjected to the update process, a file after copying is set as the link destination.

21. A database managing method according to claim 20, wherein said reference number is incremented by one in a settling process of said transaction when said transaction is an insert transaction.

22. A database managing method according to claim 20, wherein said reference number is decremented by one in a settling process of said transaction when said transaction is a delete transaction.

23. A database managing system for managing table information containing a record and data not stored in the table information, comprising:
   create means for creating, when a request for process of said data managed by a file server is inputted in a memory of said file server, a data structure indicating the processing procedure based on a reference number of at least one link between records managed by a database server and contents in said file server managed in relation to said records for managing said data on the basis of position management information storing position information of said data contained in said record and said inputted request;

execution means for executing a process of maintaining consistency concerning said data managed by a file server on the basis of said data structure which includes reference number to said data managed by said file server and a commit process when said commit process issued from said database server is carried out in a transaction for processing said request;

managing means for managing a number of links to the same external file;

updating means for preparing a copy of the external file and updating the copy during an update of the content of the external file in a link destination file update process; and means for setting a file as the link destination after copying, for only a field in a record subjected to the update process.

24. A database managing method for linking table information managed by a database management system to a file server in a database server for linking table information managed by a database management system to a file server, comprising:

a CPU;
a DBMS memory;
a database management system;
a network interface to be connected to a user client and a file server, said file server including contents, a file of contents attribute, a data structure having an identifier of user client, and an abstract data type of contents for each of records of the contents for each of records of the contents as well as directory paths thereof, and a file management system for managing said contents;

said method comprising:
creating, when a request for update of said data managed by said file server is inputted in said server memory of said file server, a data structure including an FMS identifier, a directory path, and a contents format together indicating the processing procedure for linking said data to a record of a transaction included in said file management system on the basis of said record and said inputted request, and communicating said data structure to said file management system of said file server; and executing a process of maintaining consistency concerning said data linked by said create means based on said data structure which includes reference number of at least one link between records managed by said create means and contents linked to said records when a commit process issued from said database server is carried out in said create means to communicate with said file management system, when said reference number of links between said records and contents linked to said records with regard to said abstract data type of said data structure is two or more, to decrement one from said reference number and executes a commit process of updating of said data, and, when said reference number is one, to keep said reference number unchanged and executes a commit process of overwriting said data.

25. A database managing method according to claim 24, further comprising:

calling an access handle creating process, which is one of extension functions concerning external files managed by the fields of the file abstract data type in said record, and referencing an external file managed by a field in said record using the access handle and said file management system.

26. A database managing method according to claim 25, wherein a plurality of files or a plurality of files having a directory structure are managed as a link destination in the field of a record, and the file structure and the content of the files of said link destination are updated in accordance with update of the field value of said abstract data type of said data structure in said database.

27. A database managing method according to claim 24, wherein a plurality of files or a plurality of files having a directory structure are managed as a link destination in the field of a record, and the file structure and the content of the files of said link destination are updated in accordance with update of the field value of said abstract data type of said data structure in said database.

28. A database managing method according to claim 24, wherein the number of links to the same external file is managed while a copy of the file is prepared and the copy is updated during update of the content of the file in a link destination file update process; and for only a field in a record subjected to the update process, a file after copying is set as the link destination.

29. A database managing method according to claim 24, wherein, when type of said request of update is of insert, the process for maintaining consistency is implemented such that, in respect of data not stored in the table information, position management information of said data is newly inserted in the record.

30. A database managing method according to claim 24, wherein, when type of said request of update is of delete, the process for maintaining consistency is implemented such that, in respect of data not stored in the table information, the position management information of said data is deleted from the record.

31. A database managing method according to claim 24, wherein, when type of said request of update is of update, the process for maintaining consistency is implemented such that, in respect of data not stored in the table information, the content of data indicative of position information stored in the position management information of said data within the record is updated.

32. A database managing method according to claim 24, wherein a number of links to the same external file is managed, a copy of the external file is prepared and the copy is updated during an update of the content of the external file in a link destination file update process, and for only a field in a record subjected to the update process, a file after copying is set as the link destination.

33. A database managing method according to claim 32, wherein said reference number is incremented by one in a setting process of said transaction when said transaction is an insert transaction.

34. A database managing method according to claim 32, wherein said reference number is decremented by one in a setting process of said transaction when said transaction is a delete transaction.

35. A database managing method according to claim 24, wherein said reference number is incremented by one in a setting process of said transaction when said transaction is an insert transaction.

36. A database managing method according to claim 35, wherein said reference number is decremented by one in a setting process of said transaction when said transaction is a delete transaction.

37. A database server for linking table information managed by a database management system, to a file server, comprising
- a CPU;
- a DBMS memory;
- a database management system;
- a network interface to be connected to a user client and a file server, said file server including contents, a file of contents attribute, a data structure having an identifier of user client, and an abstract data type of contents for each of records of the contents for each of records of the contents as well as directory paths thereof, and a file management system for managing said contents;
- create means for creating, when a request for update of said data managed by said file server is inputted in said server memory of said file server, a data structure including an FMS identifier, a directory path, and a contents format together indicating the processing procedure for linking said data to a record of a transaction included in said file management system based on said record and said inputted request, and communicating said data structure to said file management system of said file server; and
- execution means for executing a process of maintaining consistency concerning said data linked by said create means based on said data structure which includes reference number of at least one link between records managed by said create means and contents linked to said records when a commit process issued from said database server is carried out in said create means to communicate with said file management system, when said reference number of links between said records and contents linked to said records with regard to said abstract data type of said data structure is two or more, to decrement one from said reference number and executes a commit process of updating of said data, and, when said reference number is one, to keep said reference number unchanged and executes a commit process of overwriting said data.

38. A database server according to claim 37, wherein the number of links to the same external file is managed while a copy of the file is prepared and the copy is updated during update of the content of the file in a link destination file update process; and
- for only a field in a record subjected to the update process, a file after copying is set as the link destination.

39. A database server according to claim 37, further comprising:
- means for calling an access handle creating process that is one of extension functions concerning external files managed by the fields of the file abstract data type in said record; and
- referencing means for referencing an external file managed by a field in said record by using the access handle and said file management system.

40. A database server according to claim 37, wherein, when type of said request of update is of insert, the process for maintaining consistency is implemented such that, in respect of data not stored in the table information, position management information of said data is newly inserted in the record.

41. A database server according to claim 37, wherein, when type of said request of update is of delete, the process for maintaining consistency is implemented such that, in respect of data not stored in the table information, the position management information of said data is deleted from the record.

42. A database server according to claim 37, wherein, when type of said request of update is of update, the process for maintaining consistency is implemented such that, in respect of data not stored in the table information, the content of data indicative of position information stored in the position management information of said data within the record is updated.

43. A database server according to claim 37, further comprising:
- execution means for executing a process of maintaining consistency concerning said data managed by a file server on the basis of said data structure which includes reference number to said data managed by said file server and a commit process when said commit process issued from said database server is carried out in a transaction for processing said request;
- managing means for managing a number of links to the same external file;
- updating means for preparing a copy of the external file and updating the copy during update of the content of the external file in a link destination file update process; and
- means for setting a file as the link destination after copying, for only a field in a record subjected to the update process.

44. A storage medium for storing a program for linking table information managed by a database management system to a file server in a database server for linking table information managed by a database management system to a file server, comprising:
- a CPU;
- a DBMS memory;
- a database management system;
- a network interface to be connected to a user client and a file server, said file server including contents, a file of contents attribute, a data structure having an identifier of user client, and an abstract data type of contents for each of records of the contents for each of records of the contents as well as directory paths thereof, and a file management system for managing said contents;
- said method comprising:
- creating, when a request for update of said data managed by said file server is inputted in said server memory of said file server, a data structure including an EMS identifier, a directory path, and a contents format together indicating the processing procedure for linking said data to a record of a transaction included in said file management system on the basis of said record and said inputted request, and communicating said data structure to said file management system of said file server; and
- executing a process of maintaining consistency concerning said data linked by said create means on the basis of said data structure which includes reference number of at least one link between records managed by said create means and contents linked to said records when a commit process issued from said database server is carried out in said create means to communicate with said file management system, when said reference number of links between said records and contents linked to said records with regard to said abstract data type of said data structure is two or more, to decrement one from said reference number and executes a commit process of updating of said data, and, when said reference number is one, to keep said reference number unchanged and executes a commit process of overwriting said data.

* * * * *